(12) United States Patent
Illikkal et al.

(10) Patent No.: US 11,989,587 B2
(45) Date of Patent: May 21, 2024

(54) APPARATUS AND METHOD FOR A RESOURCE ALLOCATION CONTROL FRAMEWORK USING PERFORMANCE MARKERS

(71) Applicant: Intel Corporation, Santa Clara, CA (US)

(72) Inventors: Rameshkumar Illikkal, Folsom, CA (US); Andrew J. Herdrich, Hillsboro, OR (US); Francesc Guim Bernat, Barcelona (ES); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 16/914,301

(22) Filed: Jun. 27, 2020

(65) Prior Publication Data

US 2021/0406075 A1 Dec. 30, 2021

(51) Int. Cl.
*G06F 9/50* (2006.01)
*G06F 9/30* (2018.01)
(Continued)

(52) U.S. Cl.
CPC ........ *G06F 9/5016* (2013.01); *G06F 9/30101* (2013.01); *G06F 9/4881* (2013.01); *G06F 11/3037* (2013.01); *G06F 11/3466* (2013.01)

(58) Field of Classification Search
CPC . G06F 9/30101; G06F 9/5016; G06F 11/3466
See application file for complete search history.

(56) References Cited

U.S. PATENT DOCUMENTS

2010/0262975 A1 10/2010 Reysa et al.
2014/0355439 A1* 12/2014 Kakadia .............. H04L 41/5025
370/235
(Continued)

OTHER PUBLICATIONS

Barrett et al. Applying reinforcement learning towards automating resource allocation and application scalability in the cloud, May 30, 2012, Retrieved from <URL:https://onlinelibrary.wiley.com/doi/epdf/10.1002/cpe.2864>, pp. 1656-1674 (Year: 2012).
(Continued)

*Primary Examiner* — Jacob Petranek
(74) *Attorney, Agent, or Firm* — Nicholson De Vos Webster & Elliott LLP

(57) ABSTRACT

An apparatus and method for dynamic resource allocation with mile/performance markers. For example, one embodiment of a processor comprises: resource allocation circuitry to allocate a plurality of hardware resources to a plurality of workloads including priority workloads associated with one or more guaranteed performance levels; and monitoring circuitry to evaluate execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages, wherein the monitoring circuitry is to detect that the workload may not meet one of the guaranteed performance levels based on the progress markers, and wherein the resource allocation circuitry, responsive to the monitoring circuitry, is to reallocate one or more of the plurality of hardware resources to improve the performance level of the workload.

24 Claims, 29 Drawing Sheets

(51) Int. Cl.
 *G06F 9/48* (2006.01)
 *G06F 11/30* (2006.01)
 *G06F 11/34* (2006.01)

(56) References Cited

U.S. PATENT DOCUMENTS

| | | | |
|---|---|---|---|
| 2016/0366026 A1* | 12/2016 | Bartfai-Walcott | ............................ H04L 41/0823 |
| 2019/0042142 A1 | 2/2019 | Casmira et al. | |
| 2019/0130327 A1* | 5/2019 | Carpenter | ............ G06F 9/45558 |
| 2021/0160153 A1 | 5/2021 | Akman et al. | |
| 2021/0303344 A1* | 9/2021 | Li | ......................... G06F 9/4881 |

OTHER PUBLICATIONS

Ejarque et al., "SLA-Driven Semantically-Enhanced Dynamic Resource Allocator for Virtualized Service Providers", Fourth IEEE International Conference on eScience, 2008, pp. 8-15.
European Search Report and Search Opinion, EP App. No. 20209776.2, Apr. 22, 2021, 11 pages.
Examination Report, IN App. No. 202044053737, Mar. 23, 2022, 6 pages.
Non-Final Office Action, U.S. Appl. No. 16/914,305, Aug. 17, 2023, 36 pages.
Office Action, EP App. No. 20209776.2, Apr. 17, 2023, 9 pages.
Vakilinia et al. Preemptive cloud resource allocation modeling of processing jobs, Jan. 11, 2018, Retrieved from <URL:https://link.springer.com/content/pdf/10.1007/s11227-017-2226-0.pdf?pdf=button%20sticky>, pp. 2116-2150 (Year: 2018).

* cited by examiner

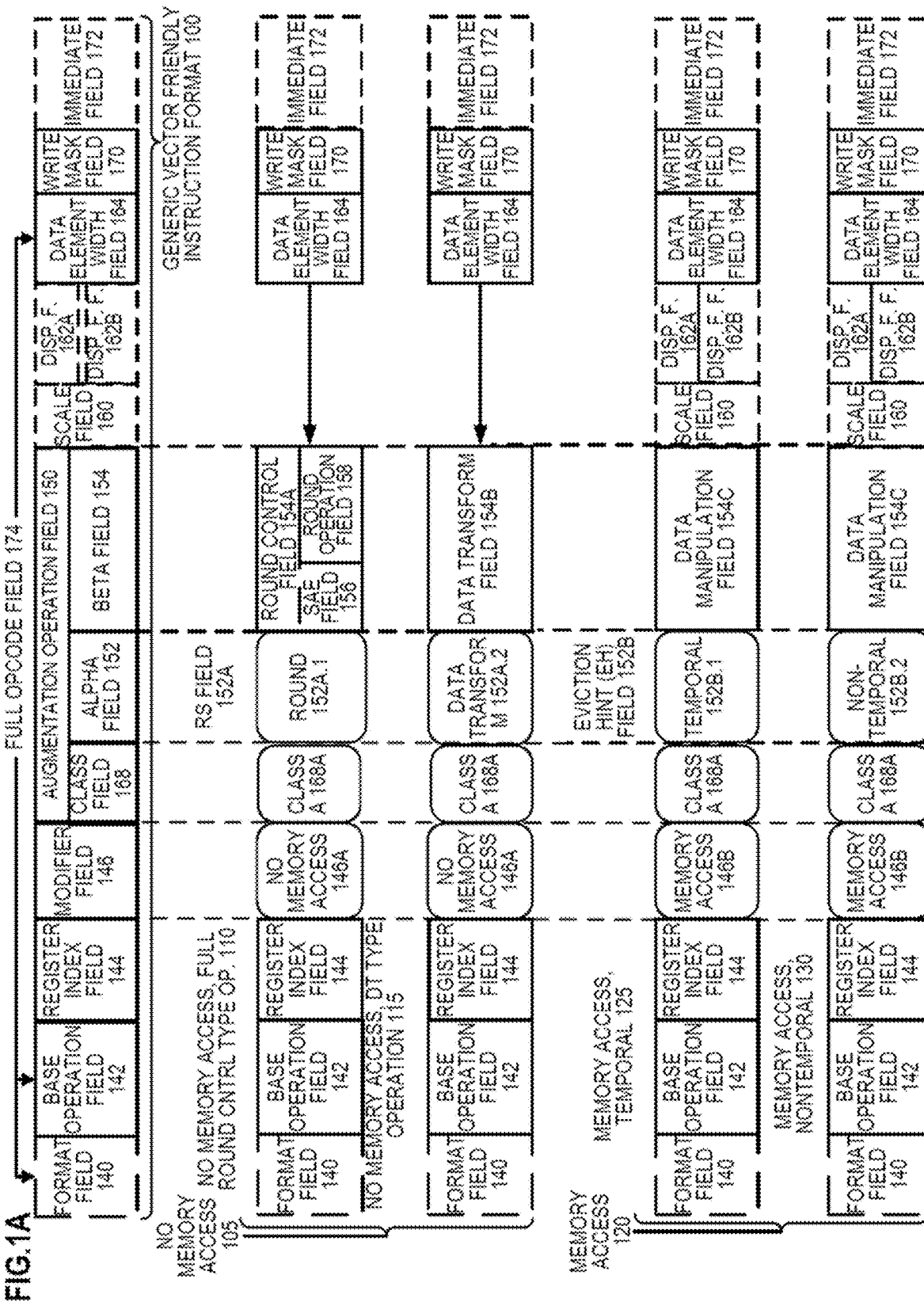

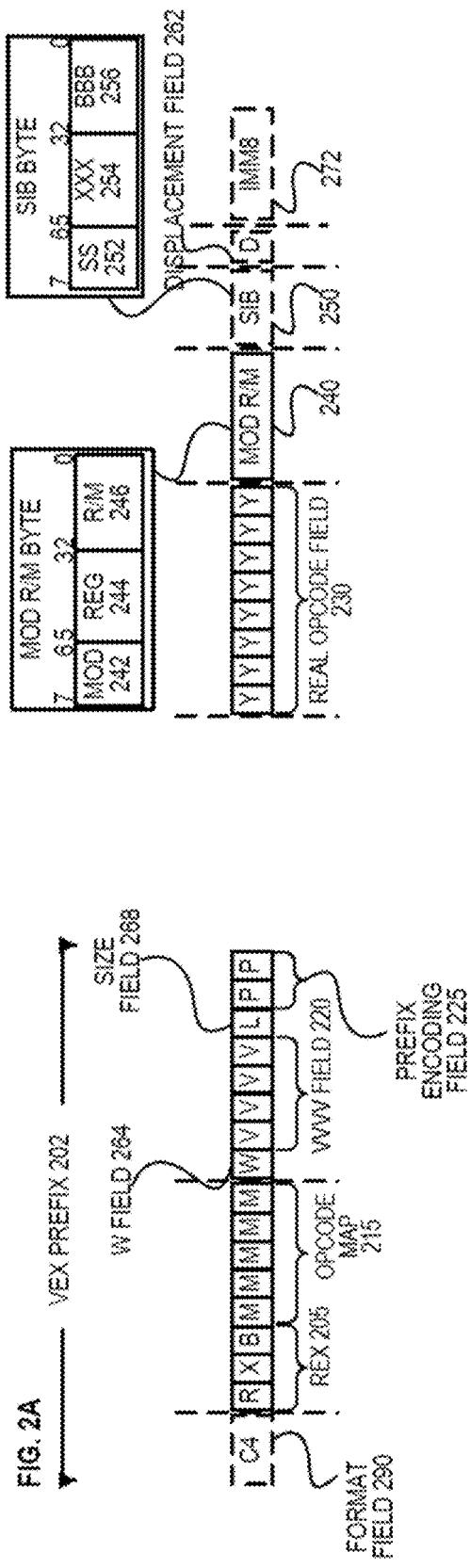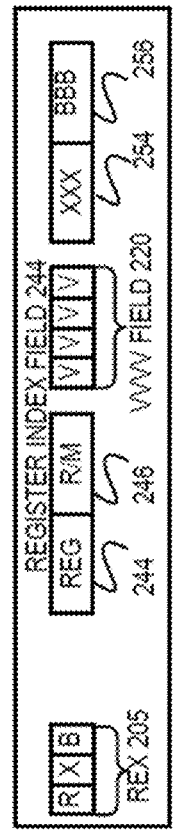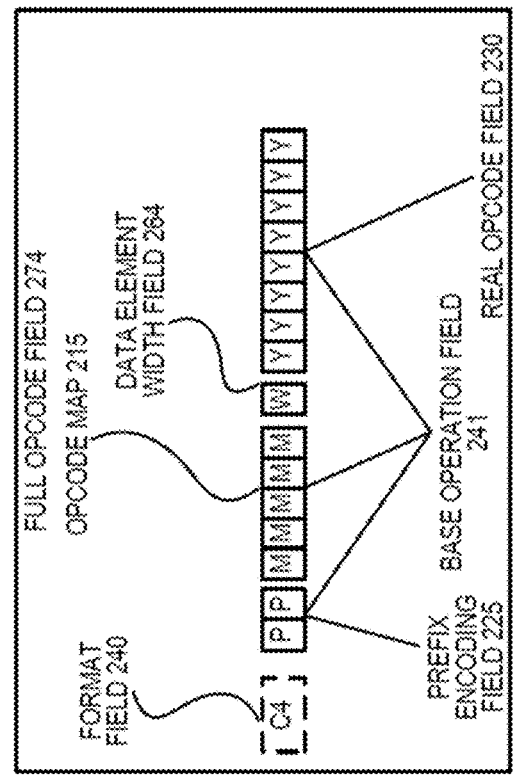

FIG. 3
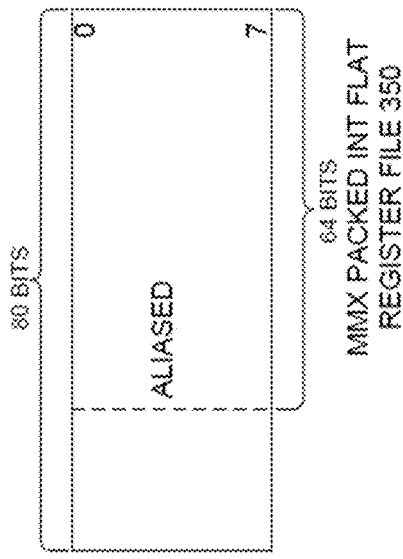
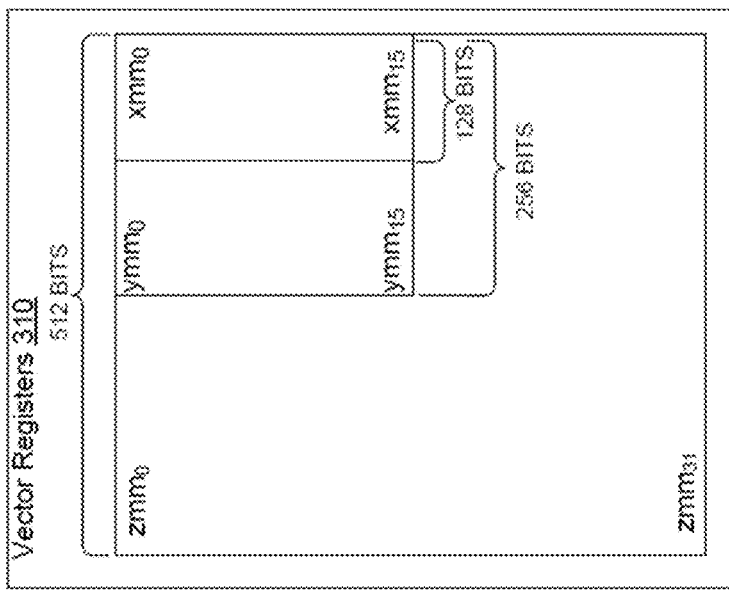

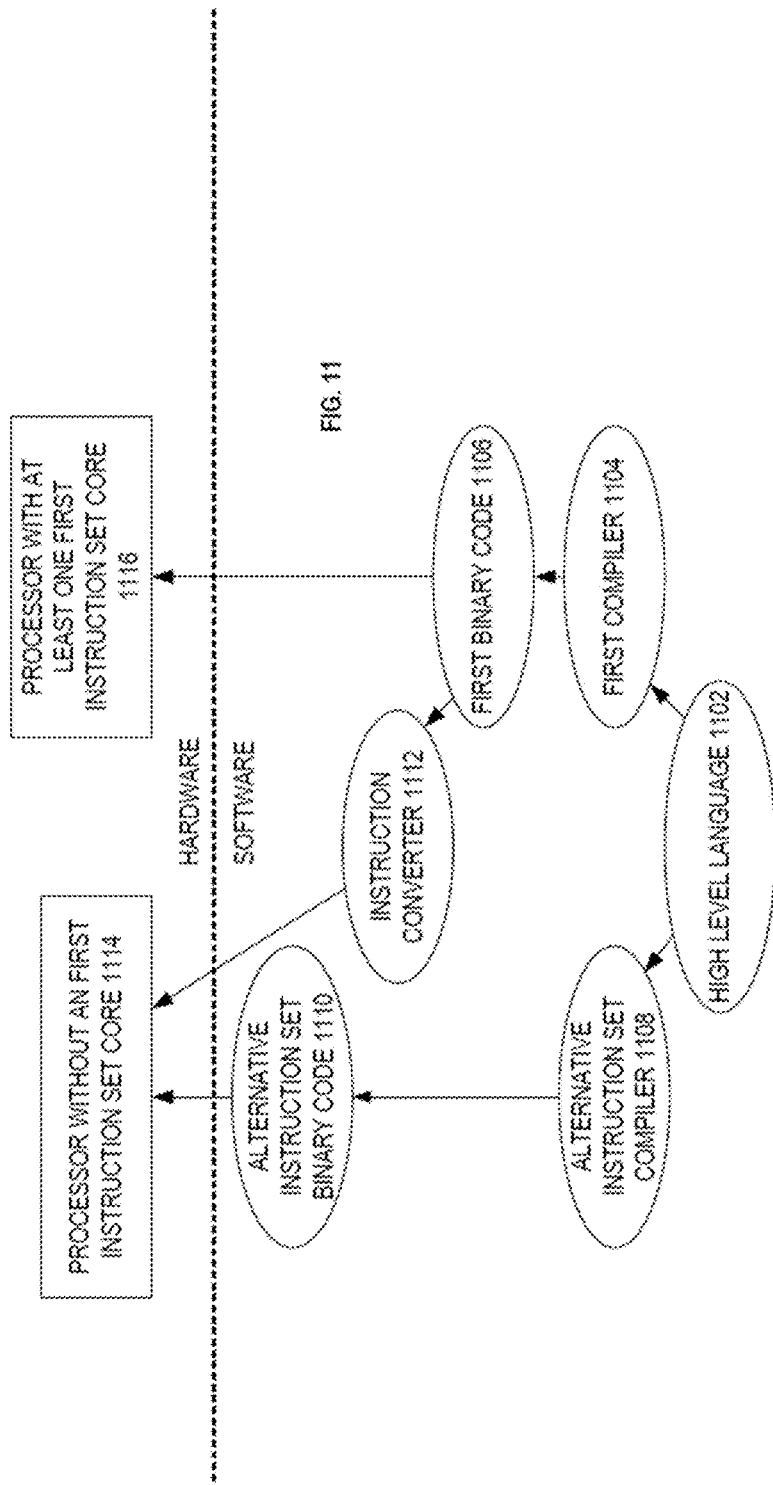

APPARATUS AND METHOD FOR A RESOURCE ALLOCATION CONTROL FRAMEWORK USING PERFORMANCE MARKERS

BACKGROUND

Field of the Invention

The embodiments of the invention relate generally to the field of computer processors. More particularly, the embodiments relate to an apparatus and method for a resource allocation control framework using performance markers.

Description of the Related Art

Quality of service is an important mechanism to enforce the priority-based fairness in computer systems and may be implemented with allocations of dedicated pathways or slots in shared buffers and queues, packet-based virtual channels, etc. Quality of service hooks are used today in caches, memory subsystem queues, memory controllers, and fabric cards.

Intel® Resource Director Technology® (RDT) provides the capability to control the manner in which shared resources such as last-level caches (LLCs) and memory bandwidth are used by applications, virtual machines (VMs), and containers. RDT helps in workload consolidation, performance consistency, and dynamic service delivery, helping driving efficiency and flexibility across the data center and networking domain while reducing overall total cost of ownership (TCO).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

FIG. 11 illustrates a block diagram contrasting the use of a software instruction converter to convert binary instructions in a source instruction set to binary instructions in a target instruction set according to embodiments of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
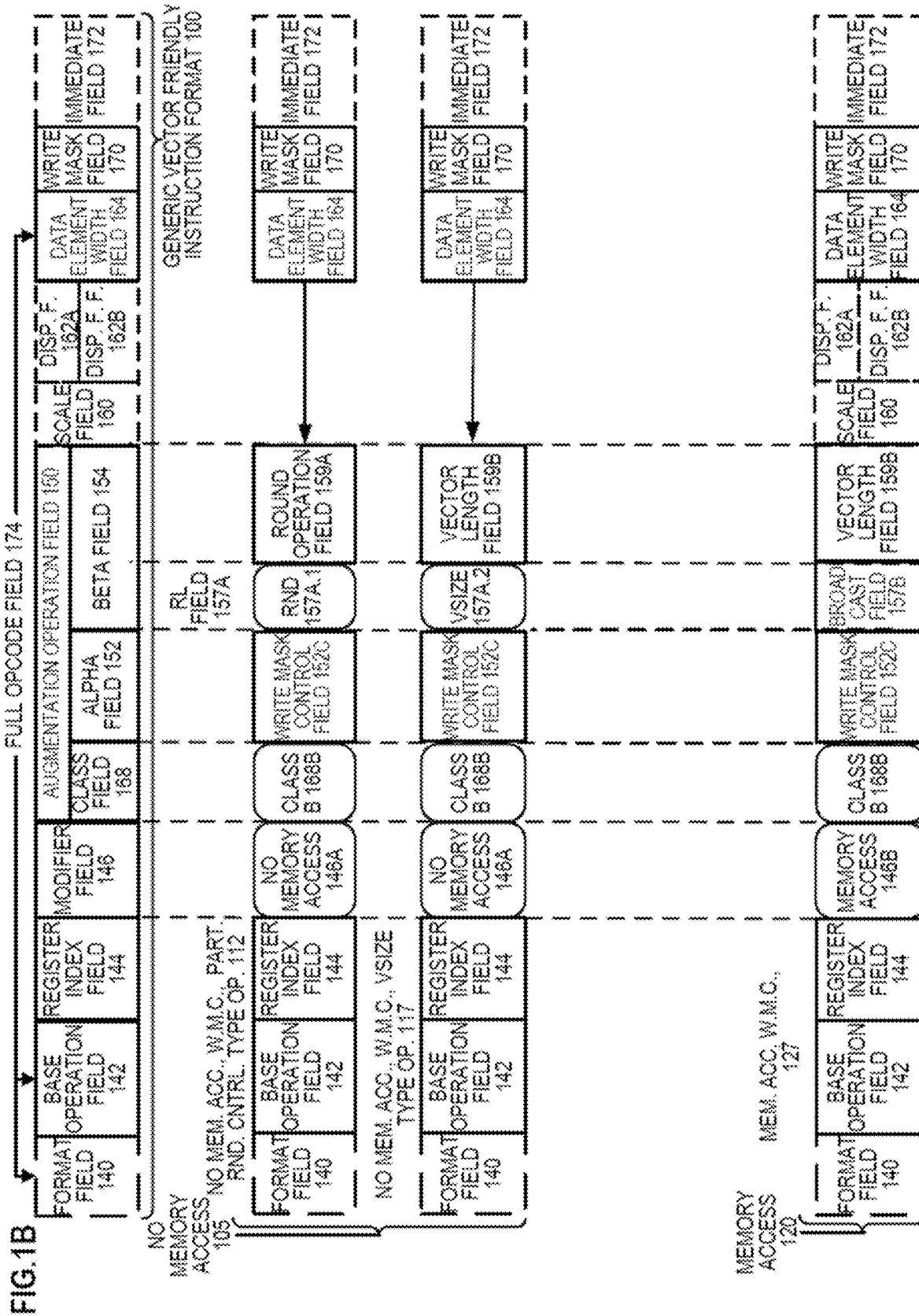

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 1546, whose content distinguishes which one of a number of data transforms is to be performed (e.g., no data transform, swizzle, broadcast).

In the case of a memory access 120 instruction template of class A, the alpha field 152 is interpreted as an eviction hint field 1526, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
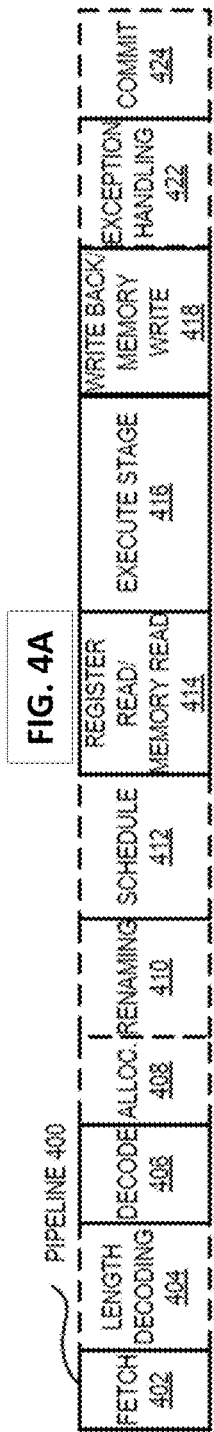
FIG. 4A is a block diagram illustrating both an exemplary in-order fetch, decode, retire pipeline and an exemplary register renaming, out-of-order issue/execution pipeline according to embodiments of the invention.
Figure 4B:
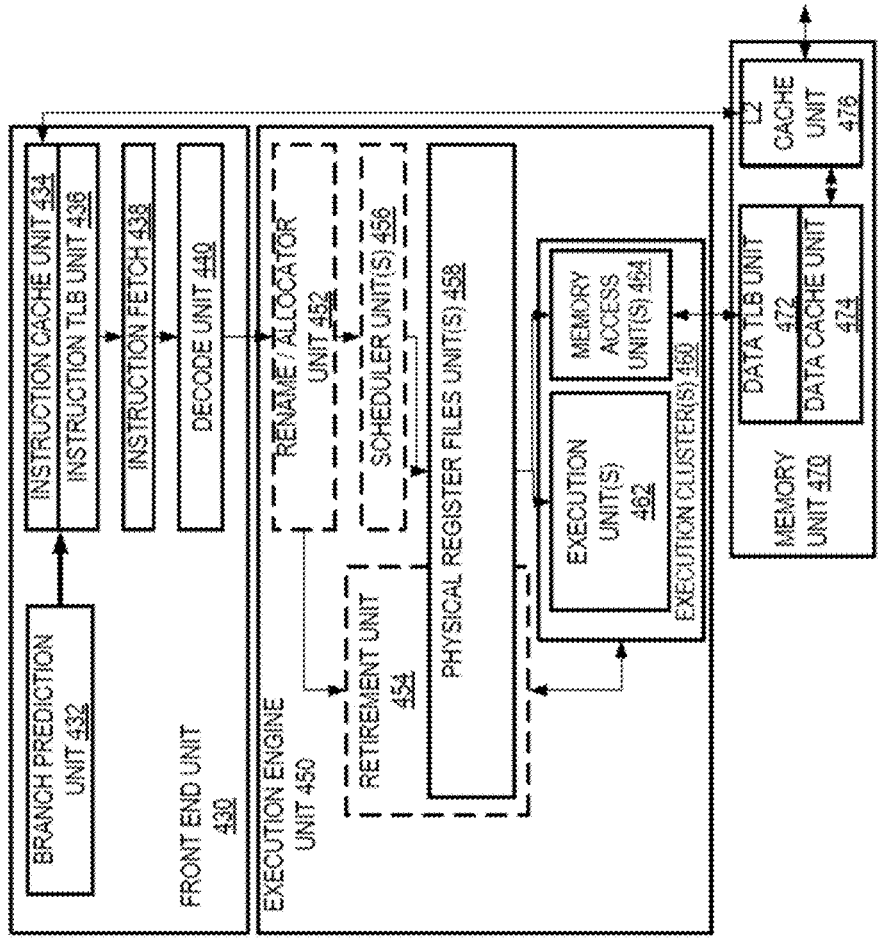
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
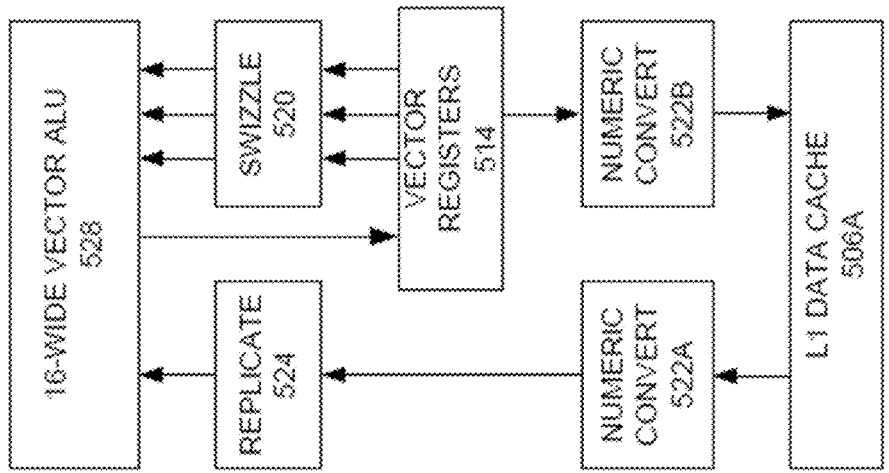
FIG. 5B illustrates an expanded view of part of the processor core in FIG. 5A according to embodiments of the invention.
Figure 5A:
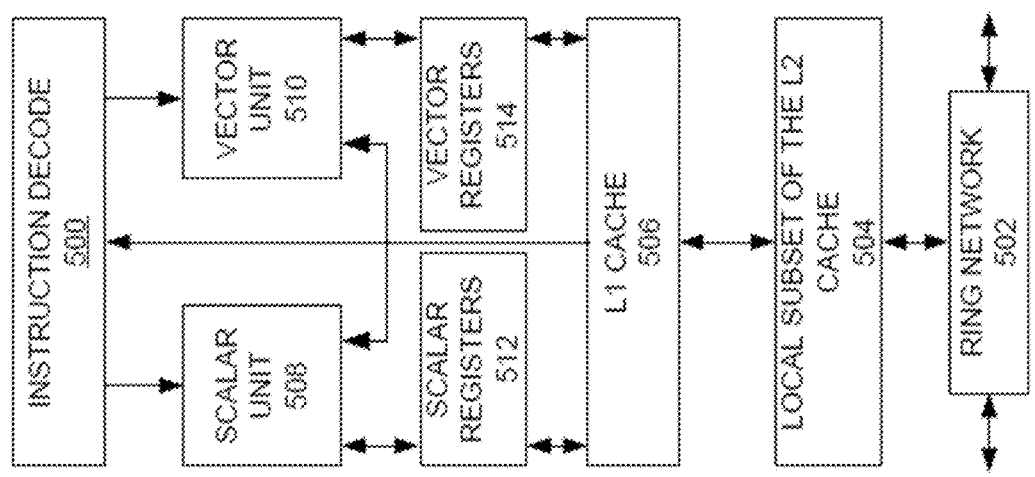
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
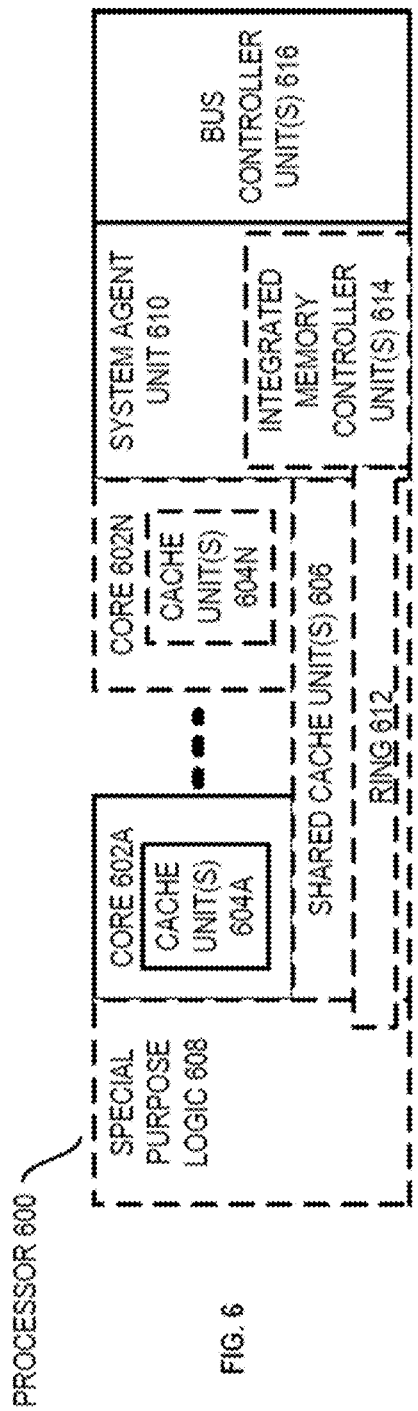
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
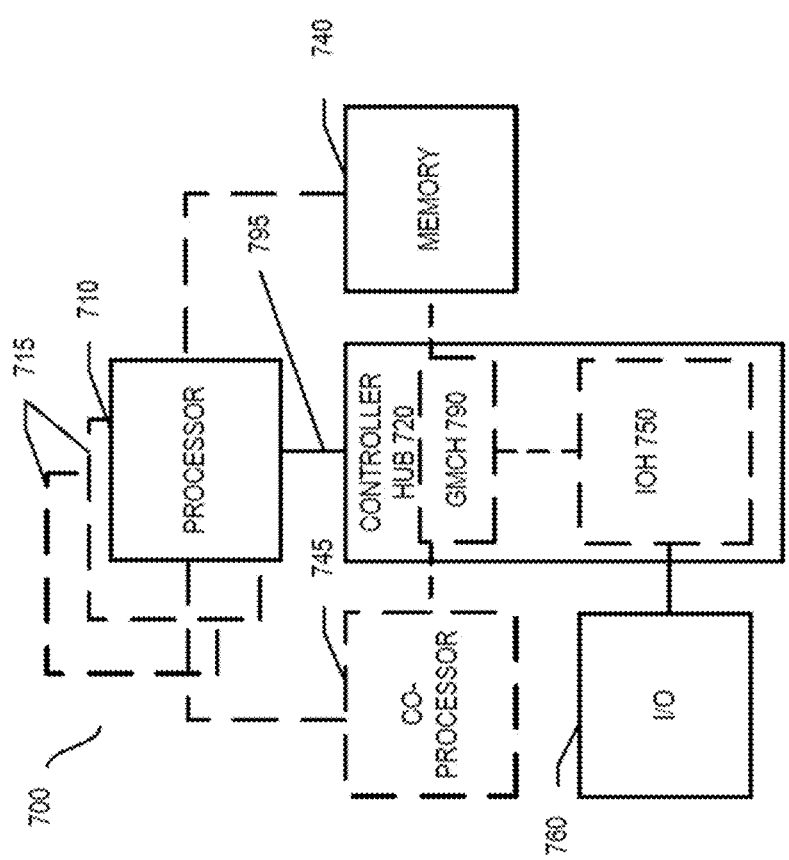
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
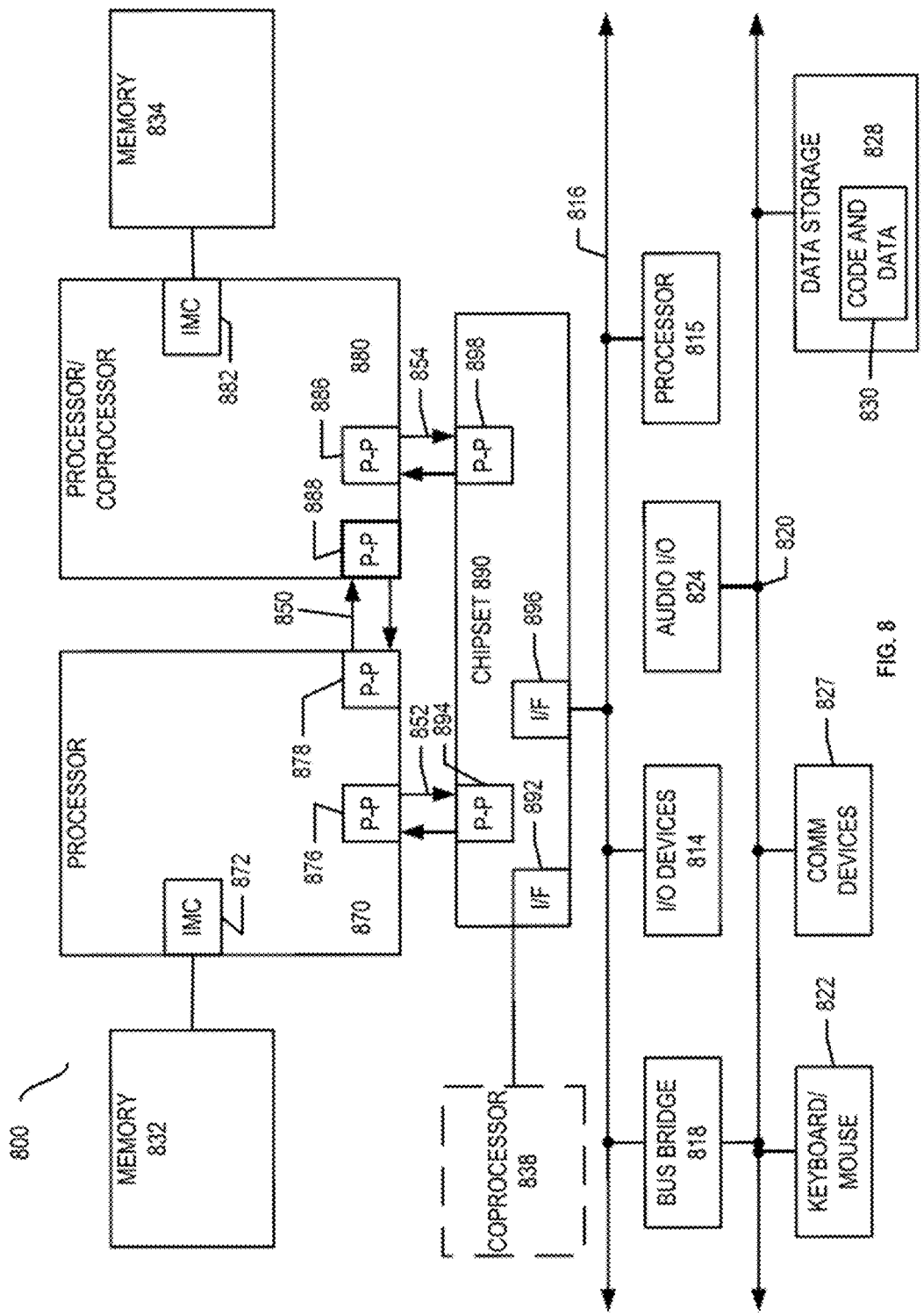
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
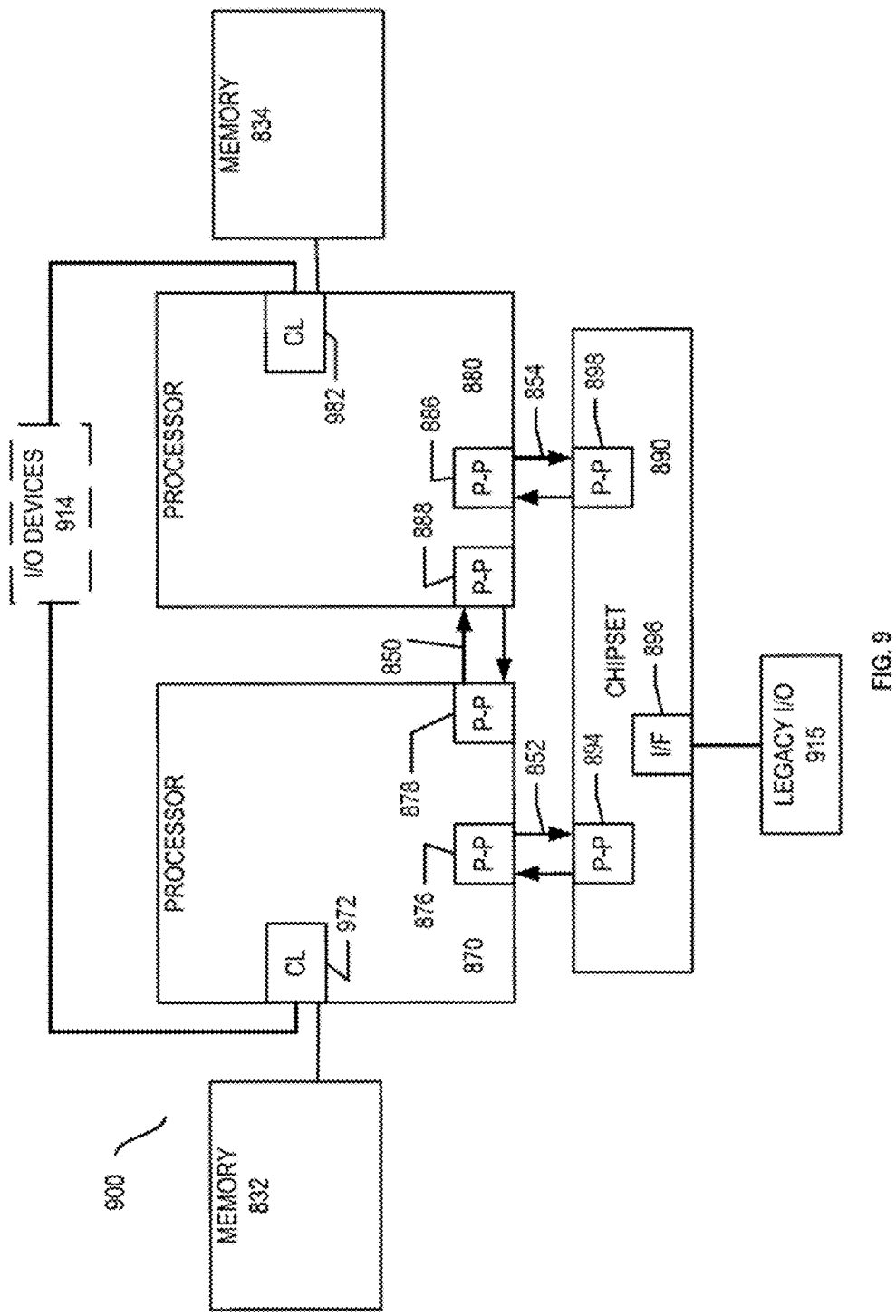
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
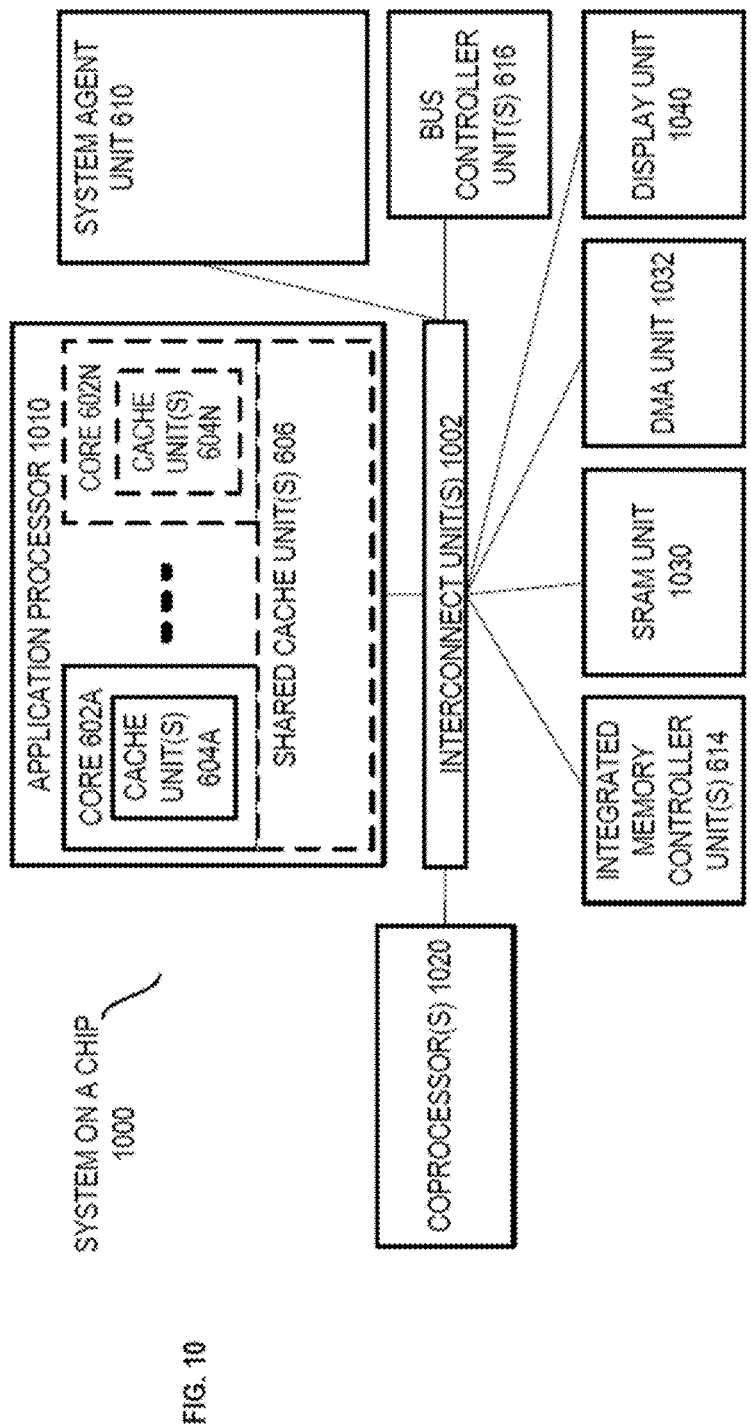
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Conditional Quality of Service in a Processor

Quality of service is an important mechanism to enforce the priority-based fairness in computer systems and may be implemented with allocations of dedicated pathways or slots in shared buffers and queues, packet-based virtual channels, etc. Quality of service hooks are used today in caches, memory subsystem queues, memory controllers, and fabric cards. However, quality of service as a feature has struggled to find traction when it comes to real-world deployments in the industry, aside from a few notable exceptions.

One of the reasons for this is that in a real-world deployment, it is often challenging to know, for example, that process X will always need dedicated bandwidth or that thread Y will always need a dedicated set of queue slots in controller queue Z. This is because these processes or threads are often dependent on external events to trigger the need for dedicated resources.

For example, process X could be implementing functionality that involves receiving a stream of high priority customer data from a network card. When this data arrives, it is critical to process it with the highest priority and add it to the database. However, this high priority burst of customer data may arrive only once an hour. The remainder of the time, process X is working in the background to add more data from disk, and build some indexes for the same dataset. In this case, it is the same process doing all of the above work, but the key insight is that only the data from the network card is high priority and that arrives only once an hour for few minutes. A static QoS allocation for process X to have dedicated pathways and queue slots in the system would be wasteful, inefficient and starve other processes from doing useful work.

The embodiments of the invention include conditional quality of service (QoS) techniques to mitigate this problem, where a quality of service rule is applied only when a certain condition or set of conditions are met. In this case, the rule could be a burst of network traffic above 1 GB/s which targets X (i.e., the per hour event). When this occurs, the QoS rule is applied for process X. Thus, using a set of intelligently crafted rules, a detected usage of a first processing resource by a process may alter the allocation of a second resource for that process. Dynamic adjustment of processing resources in this manner reduces the likelihood that one particular resource becomes a performance bottleneck to the overall process.

Figure 12A:
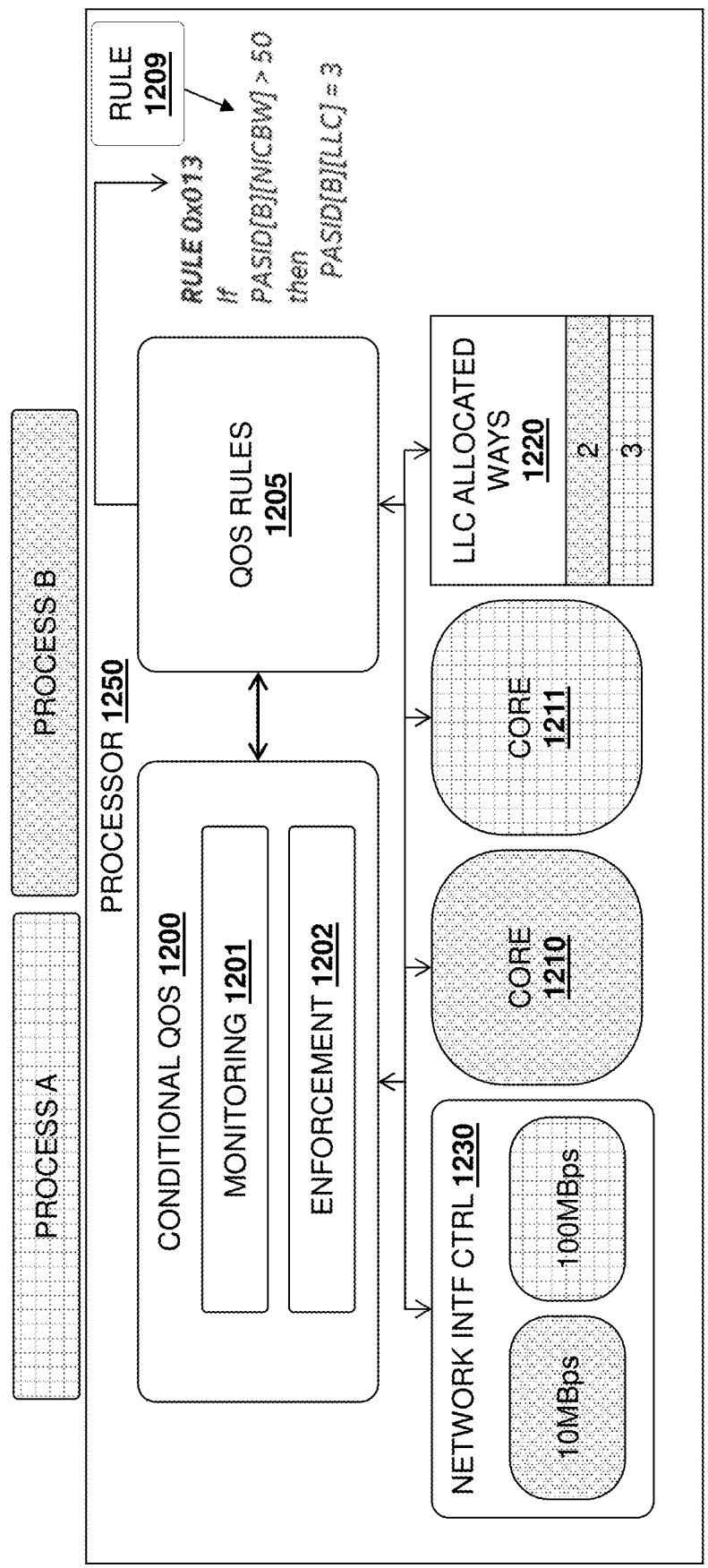
FIGS. 12A-B illustrate an embodiment in which a set of rules specify allocation of a first resource based on usage of a second resource.
Figure 12B:
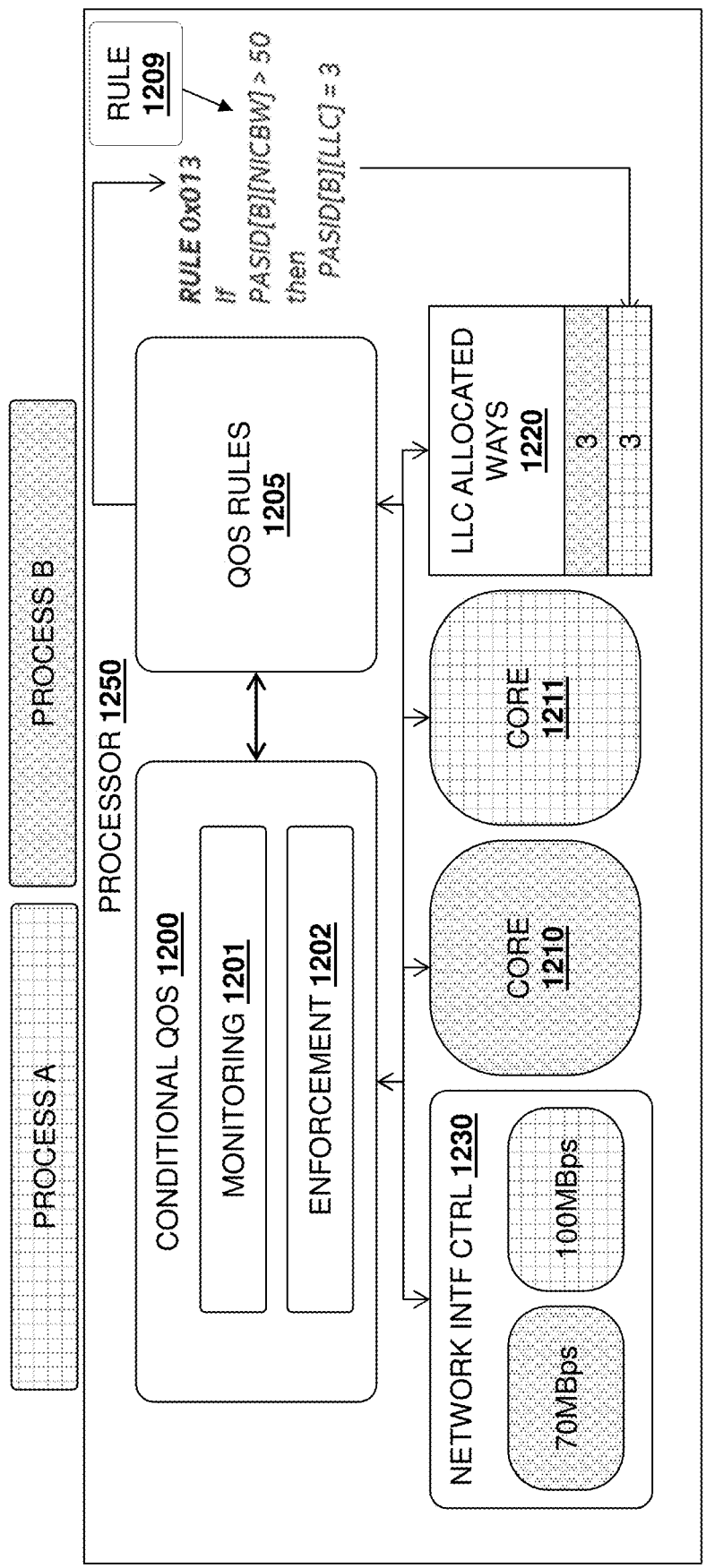

FIGS. 12A-B illustrate a processor 1250 for implementing the techniques described herein. In one embodiment, conditional monitoring circuitry/logic 1200 of the processor 1250 performs conditional QoS operations in accordance with a set of QoS rules 1205. The conditional QoS circuitry/logic may be implemented in hardware (e.g., a set of control registers/MSRs) or using a combination of hardware and software/firmware.

The illustrated conditional QoS circuitry/logic 1200 includes conditional monitoring circuitry/logic 1201 for monitoring resource usage for a plurality of processes, threads, logical processors, and/or other logical grouping of instructions. Thus, while the discussion below focuses on the allocation of resources to "processes," the underlying principles of the invention may be applied to any logical program code grouping. For the purpose of illustration, two processes are shown in FIGS. 12A-B: Process A and Process B.

The monitoring circuitry/logic 1201 may include, for example, one or more registers to specify the resources to be monitored for each process. These resources may include, but are not limited to, memory bandwidth usage, cache occupancy (e.g., within an LLC, L2 cache, etc), and network bandwidth. Various other metrics may be tracked while still complying with the underlying principles of the invention.

In one embodiment, a process identifier such as a Process Address Space ID (PASID) is associated with each process and used to track resource usage for that process. In addition, a class of service (CLOS) value may be associated with a particular process (e.g., Process A) by mapping the PASID value of that process with the CLOS value. In some embodiments, groups of processes may be assigned resource monitoring ID (RMID) values, which may be associated with a particular class of service to be conditionally applied for each group of processes.

One embodiment of the conditional QoS circuitry/logic 1200 also includes conditional QoS enforcement circuitry/logic 1202 for enforcing the resource usage constraints established by the QoS rules 1205 and the designated class of service. In particular, the enforcement circuitry/logic 1202 may evaluate resource usage data tracked by the monitoring circuitry/logic 1201 to render enforcement decisions in combination with the QoS rules 1205 (and potentially other values such as the class of service). For example, if Process A has reached a maximum L3 cache occupancy (e.g., ⅓ of the cache), then the QoS enforcement circuitry/logic 1202 will require Process A to evict L3 cache entries before adding new ones (e.g., based a least recently used (LRU) or other cache management policy).

In one embodiment, the conditional QoS circuitry/logic 1200 operates in accordance with a set of conditional QoS rules 1205 that describe the quality of service monitoring and enforcement of a particular resource (e.g., cache, memory bandwidth, etc) for a particular process ID. In this case, multiple rules can be defined to identify when a particular service level agreement (SLA) for that resource must be changed based on telemetry data acquired from other processor resources (e.g., acquired by conditional monitoring circuitry 1201). In some embodiments, the SLA is just another term referring to the class of service (CLOS) associated with a particular process. Alternatively, an SLA may be distinct from the defined classes of service and/or may be assigned to a particular CLOS. In one embodiment, the first QoS rule 1205 that matches the current performance data associated to the set of rules (for a particular resource and PASID) is used to identify the SLA to be enforced.

In one embodiment, the quality of service enforcement circuitry/logic 1202 interacts with the conditional monitoring circuitry/logic 1201 to apply a specific SLA for a particular resource and PASID when a particular rule is triggered from the set of QoS rules 1205. If the particular SLA cannot be enforced, one embodiment of the QoS enforcement circuitry/logic generates an interrupt (e.g., a software interrupt to the software stack).

The illustrated processor 1250 includes a network interface controller 1230 with different amounts of network bandwidth allocated to Process A (10 MBps in FIG. 12A) and Process B (100 MBps in FIG. 12A). In addition, an indication of a number of LLC ways 1220 allocated to Process A and Process B is shown. Both the network interface controller bandwidth and the number of allocated cache ways may be dynamically adjusted for each process based on the current monitored conditions and the QoS rules 1205 being implemented. Also shown in FIGS. 12A-B are two cores 1210-1211, although the underlying principles of the invention may be implemented on processors with any number of cores.

As indicated by the different patterns in FIG. 12A, process A, executed on core 1211, is consuming 100 Mbps bandwidth on the network interface controller 1230 and is allocated three LLC cache ways. Process B, executed on core 1210, is consuming 10 MBps of the NIC 1230 and is allocated two LLC cache ways. In this example, the QoS rules 1205 specify that the number of LLC ways 1220 allocated to a process is dependent on the amount of traffic for that process measured at the integrated network controller 1230. For example, conditional telemetry data collected by the QoS monitoring circuitry 1201 may indicate that the traffic used by process B jumps from 10 MBps in FIG. 12A to 70 MBps in FIG. 12B. A particular rule 1209 shown in both figures specifies a threshold bandwidth value of 50 MBps, above which a third cache way is to be allocated to process B, as indicated in FIG. 12B.

Similarly, multiple rules for other resources can be triggered by the increase of the network traffic (and/or other types of traffic) to a specified threshold (or multiple different thresholds). Hence, with these embodiments, different resources can be dynamically adapted to new SLAs for process B depending on detected changes to the resource consumption of process B.

Figure 13:
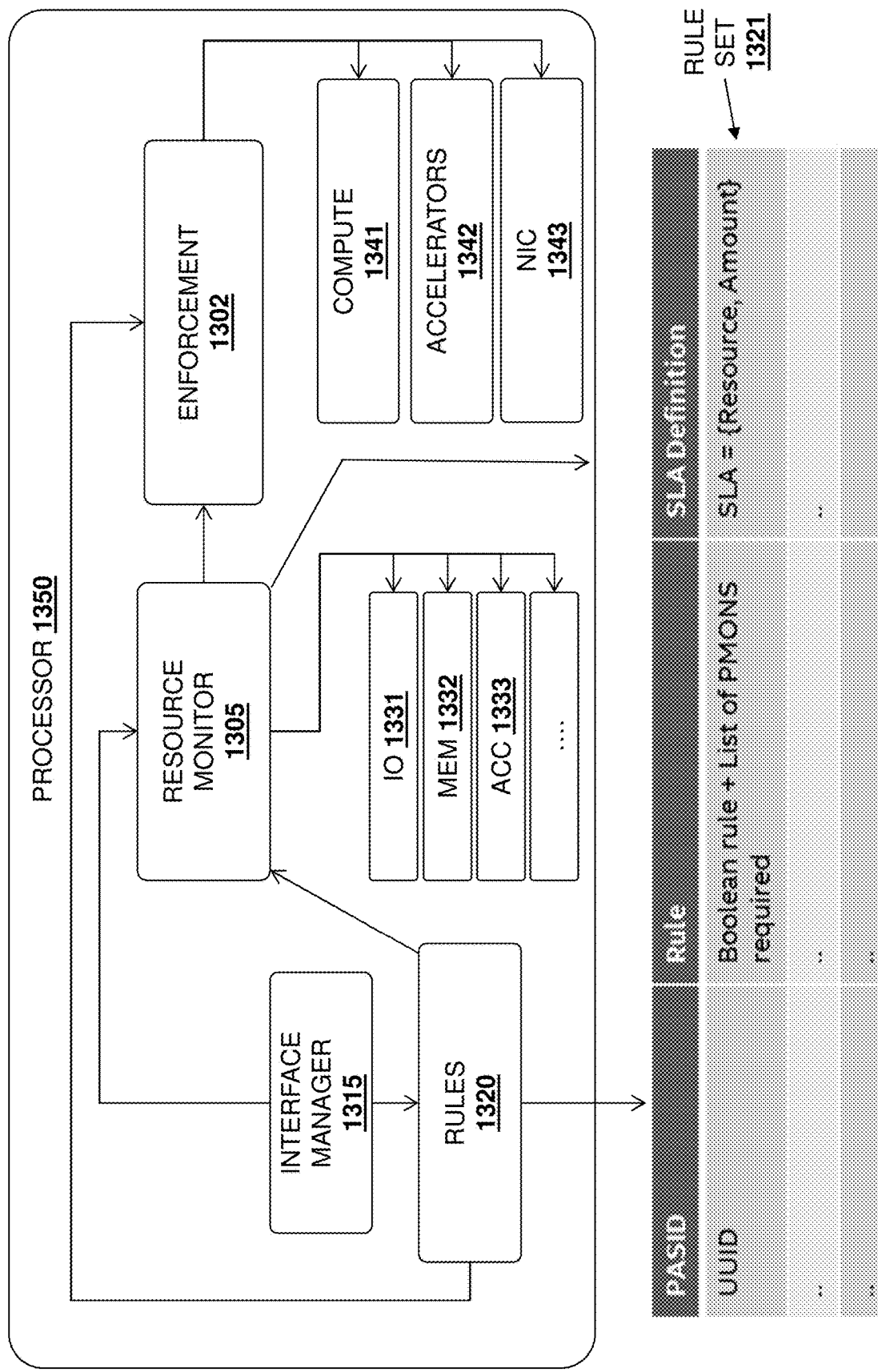
FIG. 13 illustrates one embodiment including a resource monitor and enforcement circuitry.

FIG. 13 illustrates additional details of one embodiment of the processor 1250, including new conditional circuitry/logic for registering and implementing quality of service rules 1320 which include telemetry-based rules. The various components illustrated in FIG. 13 may be implemented as circuitry or using a combination of circuitry and software/firmware.

A resource monitor 1305 (which is an SLA-based monitor in one embodiment) monitors various processor resources as specified by the current set of rules 1320, including IO resources 1331 (e.g., IO bandwidth consumed by each process), memory resources 1332 (e.g., memory bandwidth and/or space consumed by each process), and accelerator resources 1333 (e.g., the fraction of the accelerator being consumed by the process). These specific processor resources are highlighted for the purpose of illustration; various other forms of processor resources may also be monitored.

In one embodiment, the resource monitor 1305 may focus its monitoring on a specific set of resources in accordance with the current set of rules 1320 (e.g., monitoring memory bandwidth when a particular rule is based on memory bandwidth). While illustrated as a single element in FIG. 13, the resource monitor 1305 may comprise differentiated circuitry for monitoring different sets of resources, some of which may be implemented in different regions of the processor 13.

The resource monitor 1305 may trigger a response from the enforcement circuitry/logic 1302 when a rule-based threshold has been reached. For example, the resource monitor 1305 may notify the enforcement circuitry/logic 1302 when the resource usage of a particular process exceeds or drops below a threshold specified in the rules 1320. Alternatively, or in addition, the enforcement circuitry/logic 1302 may operate independently or semi-independently from the resource monitor 1305 to dynamically adjust resource allocations based on the current set of rules 1320 (e.g., increasing the number of L3 cache ways when the network bandwidth of a process exceeds a threshold). For example, the enforcement circuitry 1302 may read the various processor counters reflecting current resource usage by a process and implement any corrective actions to comply with the current set of rules 1320. In FIG. 13, for example, the enforcement circuitry/logic 1302 may adjust the process utilization of one or more compute engines 1341, accelerators 1342, and network interface controllers 1343 based on notifications received from the resource monitor 1305, and/or resource monitoring data read directly from the processor's registers.

In one embodiment, an interface manager 1315 provides access to the set of rules 1320, the resource monitor 1305, and/or the enforcement circuitry/logic 1302. For example, privileged software (e.g., an OS or Hypervisor) may update the set of rules 1320 to monitor/enforce new resources and/or new resource variables or thresholds. The interface manager 1315 may expose a programming interface to software to perform these updates.

An example rule set 1321 is shown in FIG. 13 comprising a table data structure with a separate row associated with each rule and a separate column to specify a process address space ID (PASID) value (identifying a process), a rule, and an SLA definition associated with the rule.

In one implementation, each rule includes one or more of the following elements:
 a. A process address space ID (PASID) that is associated with the application or service to which the conditional SLA is attached.
 b. A unique rule identifier (RID) to identify the rule.
 c. A description of the rule. In one embodiment, a rule may refer to any processor facilities for monitoring processor activity including, but not limited to, a set of performance counters (e.g., to count LLC misses, NIC bandwidth, memory bandwidth, etc). Rules may specify specific resource thresholds and/or more complex relationships between resources. For example, a rule may specify an allocation or deallocation to be performed when the network interface bandwidth drops below a specified multiple of the memory bandwidth (or vice versa). A rule may also include a Boolean expression that is defined using the performance counters (e.g., X=0 if NIC bandwidth is less than 50 MBps and X=1 if NIC bandwidth is greater than or equal to 50 MBps).
 d. A Service Level Agreement definition associated with the rule. The service level agreement may include a particular resource with a particular resource ID and an amount of that resource to be allocated to the corresponding PASID when the rule is triggered and selected. In one embodiment, the SLA definition may also include a priority for that particular rule.

In one embodiment, the resource monitor 1305 is responsible for executing the rules 1320 and identifying those rules which need to be implemented by the enforcement circuitry/logic 1302. In one implementation, every N units of time (N being configurable using a control register such as an MSR or any other CPU interface), the resource monitor 1305 and/or enforcement circuitry/logic 1302 performs the following operations:
 a. Execute each of the rules 1320, collecting the required data from the relevant performance counters. Then execute the Boolean formula based on the results to generate the Boolean values associated with each rule.
 b. Search the rule set 1321 and select the first rule or first set of rules with a Boolean value set to 1. A priority scheme may be implemented to determine the order of the search (e.g., searching rules associated with higher priority PASID values before those with lower priority PASID values). If no prioritization is used, the registration order may be followed (e.g., the order in which each rule is inserted in the rule set 1321).

c. Per each of the selected Boolean rules, the resource monitor 1305 and/or enforcement circuitry/logic 1302 configures the SLA registered for the particular PASID and selected resource. For example, the enforcement circuitry/logic 1302 may configure relevant resources to ensure compliance with the rule. In one embodiment, if the SLA cannot be achieved, the enforcement circuitry/logic 1302 may generate a software interrupt to notify that the particular SLA has not been configured due to lack of resources. For example, if there are an insufficient number of LLC ways to be allocated to the PASID or there is insufficient I/O bandwidth, then an interrupt may be generated.

Figure 14:
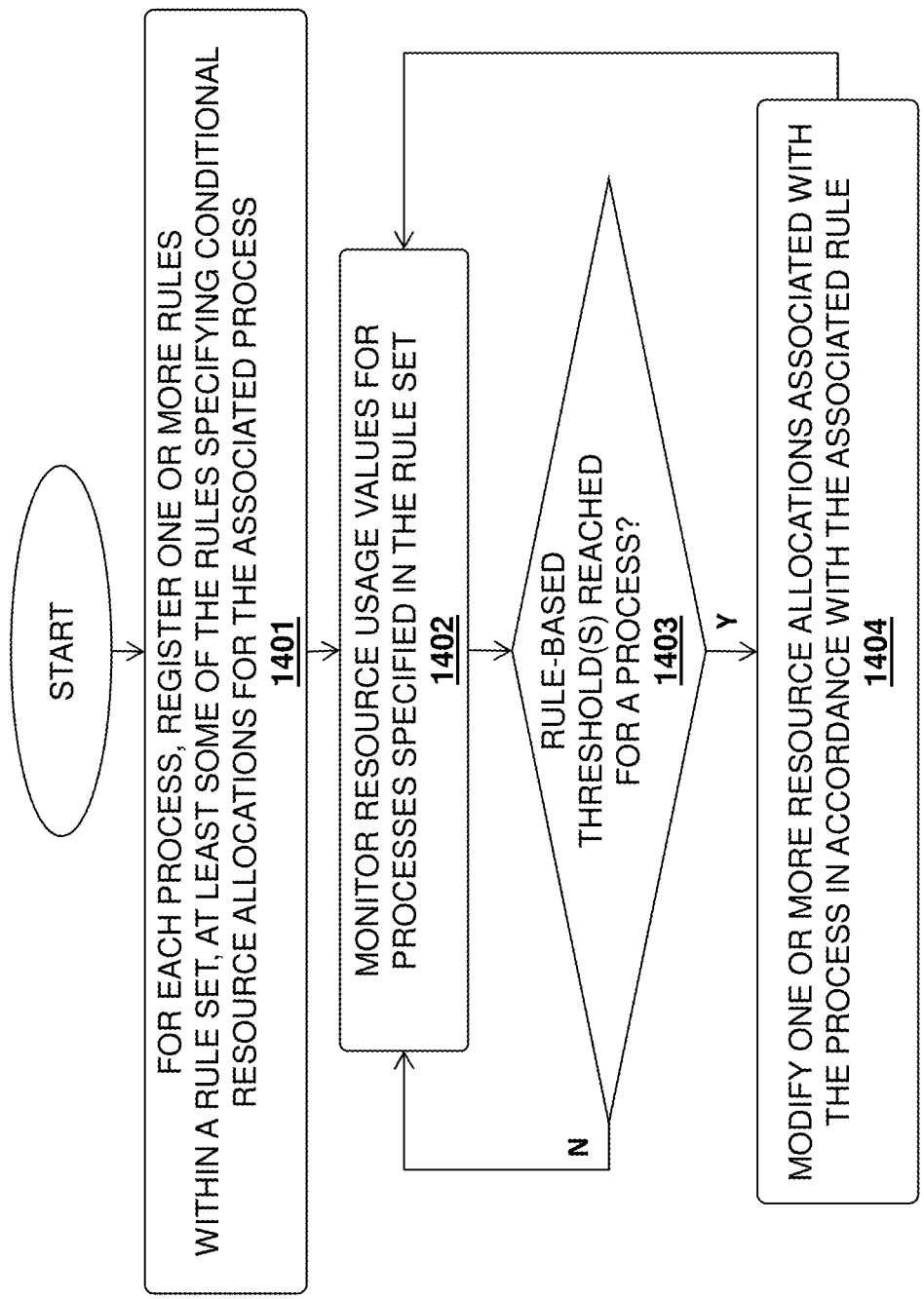
FIG. 14 illustrates a method in accordance with one embodiment of the invention.

A method in accordance with one embodiment of the invention is illustrated in FIG. 14. The method may be implemented on the architectures described above, but is not limited to any particular architecture.

At 1401, for each process, one or more rules are registered within a rule set. At least some of the rules specify conditional resource allocations for the associated process. As described above, for example, a conditional resource allocation may specify one or more thresholds to trigger new resource allocations.

At 1402, resource usage values are monitored for each of the processes as specified in the rule set. For example, a set of counters may be configured to count based on resource usage of each respective process. In one embodiment, telemetry data from remote devices may be collected and used in combination with the local resource usage values as input to the rule set.

At 1403, a determination is made as to whether a rule-based threshold has been reached. For example, one or more of the counter values may be compared against one or more of the thresholds. When a threshold is reached, at 1404, one or more resource allocations associated with the process may be adjusted in accordance with the associated rule. For example, for a given process or group of processes, if resource usage associated with a first resource passes a threshold, the resource allocation of a second resource is updated for that process or group of processes.

Apparatus and Method for Conditional Quality of Service in a Processor

Quality of service is an important mechanism to enforce the priority-based fairness in computer systems and may be implemented with allocations of dedicated pathways or slots in shared buffers and queues, packet-based virtual channels, etc. Quality of service hooks are used today in caches, memory subsystem queues, memory controllers, and fabric cards. However, quality of service as a feature has struggled to find traction when it comes to real-world deployments in the industry, aside from a few notable exceptions.

One of the reasons for this is that in a real-world deployment, it is often challenging to know, for example, that process X will always need dedicated bandwidth or that thread Y will always need a dedicated set of queue slots in controller queue Z. This is because these processes or threads are often dependent on external events to trigger the need for dedicated resources.

For example, process X could be implementing functionality that involves receiving a stream of high priority customer data from a network card. When this data arrives, it is critical to process it with the highest priority and add it to the database. However, this high priority burst of customer data may arrive only once an hour. The remainder of the time, process X is working in the background to add more data from disk, and build some indexes for the same dataset. In this case, it is the same process doing all of the above work, but the key insight is that only the data from the network card is high priority and that arrives only once an hour for few minutes. A static QoS allocation for process X to have dedicated pathways and queue slots in the system would be wasteful, inefficient and starve other processes from doing useful work.

The embodiments of the invention include conditional quality of service (QoS) techniques to mitigate this problem, where a quality of service rule is applied only when a certain condition or set of conditions are met. In this case, the rule could be a burst of network traffic above 1 GB/s which targets X (i.e., the per hour event). When this occurs, the QoS rule is applied for process X. Thus, using a set of intelligently crafted rules, a detected usage of a first processing resource by a process may alter the allocation of a second resource for that process. Dynamic adjustment of processing resources in this manner reduces the likelihood that one particular resource becomes a performance bottleneck to the overall process.

FIGS. 12A-B illustrate a processor 1250 for implementing the techniques described herein. In one embodiment, conditional monitoring circuitry/logic 1200 of the processor 1250 performs conditional QoS operations in accordance with a set of QoS rules 1205. The conditional QoS circuitry/logic may be implemented in hardware (e.g., a set of control registers/MSRs) or using a combination of hardware and software/firmware.

The illustrated conditional QoS circuitry/logic 1200 includes conditional monitoring circuitry/logic 1201 for monitoring resource usage for a plurality of processes, threads, logical processors, and/or other logical grouping of instructions. Thus, while the discussion below focuses on the allocation of resources to "processes," the underlying principles of the invention may be applied to any logical program code grouping. For the purpose of illustration, two processes are shown in FIGS. 12A-B: Process A and Process B.

The monitoring circuitry/logic 1201 may include, for example, one or more registers to specify the resources to be monitored for each process. These resources may include, but are not limited to, memory bandwidth usage, cache occupancy (e.g., within an LLC, L2 cache, etc), and network bandwidth. Various other metrics may be tracked while still complying with the underlying principles of the invention.

In one embodiment, a process identifier such as a Process Address Space ID (PASID) is associated with each process and used to track resource usage for that process. In addition, a class of service (CLOS) value may be associated with a particular process (e.g., Process A) by mapping the PASID value of that process with the CLOS value. In some embodiments, groups of processes may be assigned resource monitoring ID (RMID) values, which may be associated with a particular class of service to be conditionally applied for each group of processes.

One embodiment of the conditional QoS circuitry/logic 1200 also includes conditional QoS enforcement circuitry/logic 1202 for enforcing the resource usage constraints established by the QoS rules 1205 and the designated class of service. In particular, the enforcement circuitry/logic 1202 may evaluate resource usage data tracked by the monitoring circuitry/logic 1201 to render enforcement decisions in combination with the QoS rules 1205 (and potentially other values such as the class of service). For example, if Process A has reached a maximum L3 cache occupancy (e.g., ⅓ of the cache), then the QoS enforcement circuitry/logic 1202 will require Process A to evict L3 cache entries before adding new ones (e.g., based on a least recently used (LRU) or other cache management policy).

In one embodiment, the conditional QoS circuitry/logic 1200 operates in accordance with a set of conditional QoS rules 1205 that describe the quality of service monitoring and enforcement of a particular resource (e.g., cache, memory bandwidth, etc) for a particular process ID. In this case, multiple rules can be defined to identify when a particular service level agreement (SLA) for that resource must be changed based on telemetry data acquired from other processor resources (e.g., acquired by conditional monitoring circuitry 1201). In some embodiments, the SLA is just another term referring to the class of service (CLOS) associated with a particular process. Alternatively, an SLA may be distinct from the defined classes of service and/or may be assigned to a particular CLOS. In one embodiment, the first QoS rule 1205 that matches the current performance data associated to the set of rules (for a particular resource and PASID) is used to identify the SLA to be enforced.

In one embodiment, the quality of service enforcement circuitry/logic 1202 interacts with the conditional monitoring circuitry/logic 1201 to apply a specific SLA for a particular resource and PASID when a particular rule is triggered from the set of QoS rules 1205. If the particular SLA cannot be enforced, one embodiment of the QoS enforcement circuitry/logic generates an interrupt (e.g., a software interrupt to the software stack).

The illustrated processor 1250 includes a network interface controller 1230 with different amounts of network bandwidth allocated to Process A (10 MBps in FIG. 12A) and Process B (100 MBps in FIG. 12A). In addition, an indication of a number of LLC ways 1220 allocated to Process A and Process B is shown. Both the network interface controller bandwidth and the number of allocated cache ways may be dynamically adjusted for each process based on the current monitored conditions and the QoS rules 1205 being implemented. Also shown in FIGS. 12A-B are two cores 1210-1211, although the underlying principles of the invention may be implemented on processors with any number of cores.

As indicated by the different patterns in FIG. 12A, process A, executed on core 1211, is consuming 100 Mbps bandwidth on the network interface controller 1230 and is allocated three LLC cache ways. Process B, executed on core 1210, is consuming 10 MBps of the NIC 1230 and is allocated two LLC cache ways. In this example, the QoS rules 1205 specify that the number of LLC ways 1220 allocated to a process is dependent on the amount of traffic for that process measured at the integrated network controller 1230. For example, conditional telemetry data collected by the QoS monitoring circuitry 1201 may indicate that the traffic used by process B jumps from 10 MBps in FIG. 12A to 70 MBps in FIG. 12B. A particular rule 1209 shown in both figures specifies a threshold bandwidth value of 50 MBps, above which a third cache way is to be allocated to process B, as indicated in FIG. 12B.

Similarly, multiple rules for other resources can be triggered by the increase of the network traffic (and/or other types of traffic) to a specified threshold (or multiple different thresholds). Hence, with these embodiments, different resources can be dynamically adapted to new SLAs for process B depending on detected changes to the resource consumption of process B.

FIG. 13 illustrates additional details of one embodiment of the processor 1250, including new conditional circuitry/logic for registering and implementing quality of service rules 1320 which include telemetry-based rules. The various components illustrated in FIG. 13 may be implemented as circuitry or using a combination of circuitry and software/firmware.

A resource monitor 1305 (which is an SLA-based monitor in one embodiment) monitors various processor resources as specified by the current set of rules 1320, including TO resources 1331 (e.g., TO bandwidth consumed by each process), memory resources 1332 (e.g., memory bandwidth and/or space consumed by each process), and accelerator resources 1333 (e.g., the fraction of the accelerator being consumed by the process). These specific processor resources are highlighted for the purpose of illustration; various other forms of processor resources may also be monitored.

In one embodiment, the resource monitor 1305 may focus its monitoring on a specific set of resources in accordance with the current set of rules 1320 (e.g., monitoring memory bandwidth when a particular rule is based on memory bandwidth). While illustrated as a single element in FIG. 13, the resource monitor 1305 may comprise differentiated circuitry for monitoring different sets of resources, some of which may be implemented in different regions of the processor 13.

The resource monitor 1305 may trigger a response from the enforcement circuitry/logic 1302 when a rule-based threshold has been reached. For example, the resource monitor 1305 may notify the enforcement circuitry/logic 1302 when the resource usage of a particular process exceeds or drops below a threshold specified in the rules 1320. Alternatively, or in addition, the enforcement circuitry/logic 1302 may operate independently or semi-independently from the resource monitor 1305 to dynamically adjust resource allocations based on the current set of rules 1320 (e.g., increasing the number of L3 cache ways when the network bandwidth of a process exceeds a threshold). For example, the enforcement circuitry 1302 may read the various processor counters reflecting current resource usage by a process and implement any corrective actions to comply with the current set of rules 1320. In FIG. 13, for example, the enforcement circuitry/logic 1302 may adjust the process utilization of one or more compute engines 1341, accelerators 1342, and network interface controllers 1343 based on notifications received from the resource monitor 1305, and/or resource monitoring data read directly from the processor's registers.

In one embodiment, an interface manager 1315 provides access to the set of rules 1320, the resource monitor 1305, and/or the enforcement circuitry/logic 1302. For example, privileged software (e.g., an OS or Hypervisor) may update the set of rules 1320 to monitor/enforce new resources and/or new resource variables or thresholds. The interface manager 1315 may expose a programming interface to software to perform these updates.

An example rule set 1321 is shown in FIG. 13 comprising a table data structure with a separate row associated with each rule and a separate column to specify a process address space ID (PASID) value (identifying a process), a rule, and an SLA definition associated with the rule.

In one implementation, each rule includes one or more of the following elements:
 a. A process address space ID (PASID) that is associated with the application or service to which the conditional SLA is attached.

b. A unique rule identifier (RID) to identify the rule.
c. A description of the rule. In one embodiment, a rule may refer to any processor facilities for monitoring processor activity including, but not limited to, a set of performance counters (e.g., to count LLC misses, NIC bandwidth, memory bandwidth, etc). Rules may specify specific resource thresholds and/or more complex relationships between resources. For example, a rule may specify an allocation or deallocation to be performed when the network interface bandwidth drops below a specified multiple of the memory bandwidth (or vice versa). A rule may also include a Boolean expression that is defined using the performance counters (e.g., X=0 if NIC bandwidth is less than 50 MBps and X=1 if NIC bandwidth is greater than or equal to 50 MBps).
d. A Service Level Agreement definition associated with the rule. The service level agreement may include a particular resource with a particular resource ID and an amount of that resource to be allocated to the corresponding PASID when the rule is triggered and selected. In one embodiment, the SLA definition may also include a priority for that particular rule.

In one embodiment, the resource monitor 1305 is responsible for executing the rules 1320 and identifying those rules which need to be implemented by the enforcement circuitry/logic 1302. In one implementation, every N units of time (N being configurable using a control register such as an MSR or any other CPU interface), the resource monitor 1305 and/or enforcement circuitry/logic 1302 performs the following operations:

a. Execute each of the rules 1320, collecting the required data from the relevant performance counters. Then execute the Boolean formula based on the results to generate the Boolean values associated with each rule.
b. Search the rule set 1321 and select the first rule or first set of rules with a Boolean value set to 1. A priority scheme may be implemented to determine the order of the search (e.g., searching rules associated with higher priority PASID values before those with lower priority PASID values). If no prioritization is used, the registration order may be followed (e.g., the order in which each rule is inserted in the rule set 1321).
c. Per each of the selected Boolean rules, the resource monitor 1305 and/or enforcement circuitry/logic 1302 configures the SLA registered for the particular PASID and selected resource. For example, the enforcement circuitry/logic 1302 may configure relevant resources to ensure compliance with the rule. In one embodiment, if the SLA cannot be achieved, the enforcement circuitry/logic 1302 may generate a software interrupt to notify that the particular SLA has not been configured due to lack of resources. For example, if there are an insufficient number of LLC ways to be allocated to the PASID or there is insufficient I/O bandwidth, then an interrupt may be generated.

A method in accordance with one embodiment of the invention is illustrated in FIG. 14. The method may be implemented on the architectures described above, but is not limited to any particular architecture.

At 1401, for each process, one or more rules are registered within a rule set. At least some of the rules specify conditional resource allocations for the associated process. As described above, for example, a conditional resource allocation may specify one or more thresholds to trigger new resource allocations.

At 1402, resource usage values are monitored for each of the processes as specified in the rule set. For example, a set of counters may be configured to count based on resource usage of each respective process. In one embodiment, telemetry data from remote devices may be collected and used in combination with the local resource usage values as input to the rule set.

At 1403, a determination is made as to whether a rule-based threshold has been reached. For example, one or more of the counter values may be compared against one or more of the thresholds. When a threshold is reached, at 1404, one or more resource allocations associated with the process may be adjusted in accordance with the associated rule. For example, for a given process or group of processes, if resource usage associated with a first resource passes a threshold, the resource allocation of a second resource is updated for that process or group of processes.

Apparatus and Method for a Closed-Loop Dynamic Resource Allocation Control Framework High priority and latency-sensitive applications, such as packet processing and web search do not fully utilize all available resources of a processor or system. For example, in online environments, to optimize the Total Cost of Ownership (TCO), service providers usually launch best effort (BE) workloads on the same server(s) that run high priority applications, so that resources can be more fully utilized (and monetized).

One challenge when such mixing occurs, is in reaching a dynamic, adaptive sharing in which the high priority workloads do not miss their SLAs due to resource shortfalls, while at the same time ensuring that servers are more fully utilized by not sequestering too many resources for high priority and latency-sensitive applications.

The embodiments of the invention balance resources between these best-effort and guaranteed-performance categories automatically, efficiently, and in a transparent manner. One particular embodiment comprises a framework to dynamically control Resource Director Technology (RDT) resource allocations at fine granularity in Intel Architecture (IA) server platforms based on traffic load. Note, however, that the underlying principles of the invention are not limited to RDT or any specific resource management architecture. The underlying goal is to ensure high priority workloads meet latency/throughput or other user defined Key Performance Indicator (KPI) targets while maximizing the performance for BE tasks, thus further improving server utilization and reducing cost.

By way of an overview, embodiments of the invention may include one or more of the following frameworks and methodologies for performing fine-grained dynamic resource allocation:

a) Leading Factor Usage. In addition to using traffic patterns and other dynamic factors, one embodiment of the framework identifies and uses one or more "leading factors" for tuning decisions. A leading factor may be determined for compute, memory, network load, and other resources, so that actions can be taken periodically and proactively to prevent backsliding on non-discretionary key performance indicators, while parlaying more resources towards best-effort tasks. Thus, for example, this embodiment may take action to prevent a potential packet loss from occurring, in contrast to existing schemes that only react after the fact.

b) Taking Preemptive Action. Even with periodic preemptive action as described above, if hardware-based detection identifies backsliding on important goals (e.g., a high priority workload's SLA), then it preemptively allocates resources from best-effort tasks. Thus, this embodiment may not wait for the start of a next time window for reallocation through the agency of a resource controller.

c) Tuning in Conjunction with Software Policies. In one embodiment, the software policy and hardware controller work in conjunction to prevent packet loss or violation of the SLA key performance indicators for a high priority workload while maximizing performance for best effort workloads. One embodiment of the platform utilizes "progress markers", also referred to as "mile markers", provided by the software stack for the different phases of the application. Using mile markers, current progress may be specified and the target that the application has for the current period. The hardware utilizes these mile markers to correlate with current resource usage and resource configuration parameters. Additional embodiments described below enable the mile markers to work at an improved granularity for all the techniques described here.

d) Capitalize on Graduated SLAs. Frequently, SLA key performance indicators (KPIs) for high priority tasks are multi-leveled, so that while a stringent SLA KPI applies in normal conditions, a gracefully degraded SLA KPI applies under conditions when transient spikes occur in the demand from high priority tasks. In one embodiment of the invention, such conditions are explicitly modeled, so that an allocation to a high priority task is designed/trained to fit a demand-pattern specific SLA.

Figure 15A:
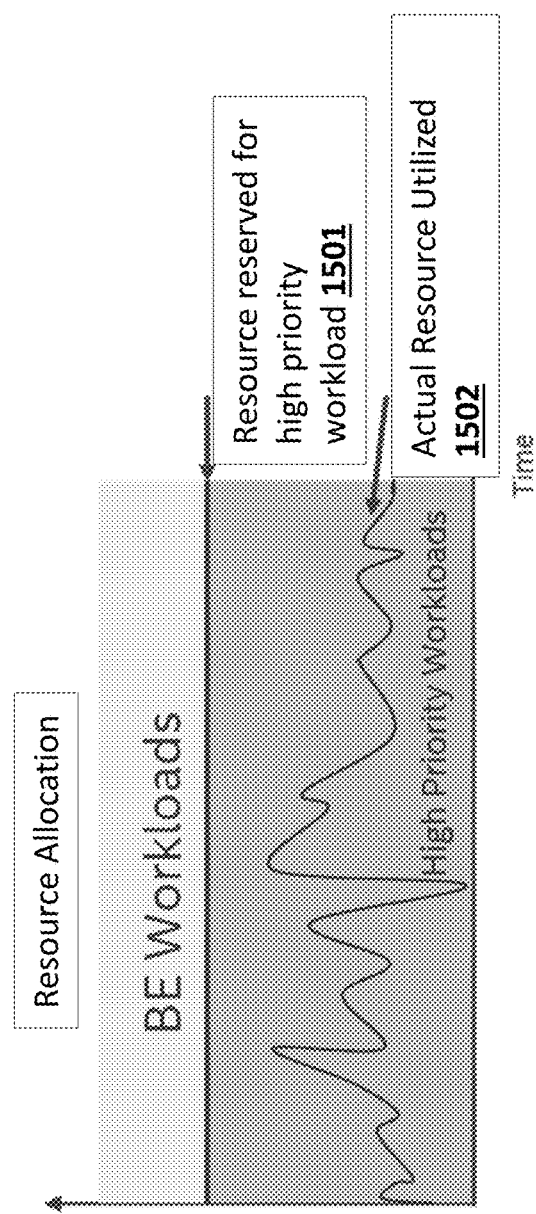
FIGS. 15A-B illustrate potential resource allocations to best effort workloads.

One embodiment of the invention will initially be described via an experimentally-verified example. FIG. 15A shows how a high priority workload is traditionally provided a certain amount of a preferred resource allocation 1501. Any best-effort "BE" workloads are provided the remainder. The curve 1502 for the high priority workload shows the actual portion of the allocated resource that gets utilized.

Figure 15B:
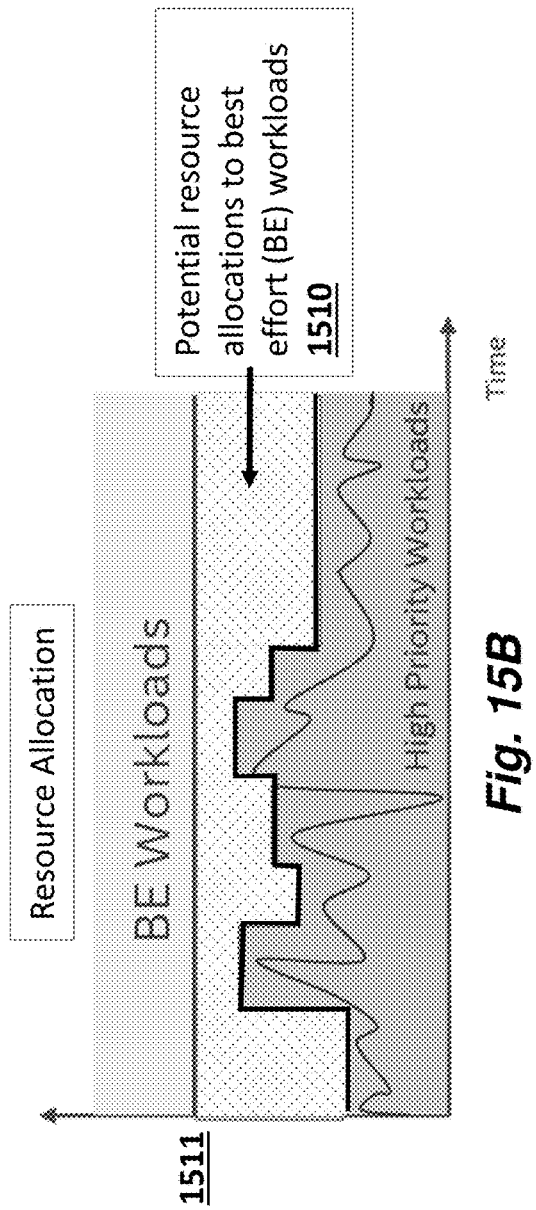

FIG. 15B shows a time-interval based, varying amount of allocation 1510 that may be safely provided to BE workloads (i.e., upper bounding the curve). One embodiment of the invention dynamically tracks resource utilization and provides this additional resource allocation to BE workloads, allowing the BE workloads to take advantage of available resources which would otherwise be left unused.

The controlled resource represented by the curves in FIGS. 15A-B could be any shared component within a processor or computing system including, but not limited to, CPU cycles, LLC utilization, memory bandwidth, memory utilization, socket-level power consumption, IO bandwidth, and page cache capacity, to name a few. Moreover, the curve need not represent a single resource. Rather, the region of redirectable dynamic resource capacity may be a multidimensional volume representing a set of related and/or unrelated resources. This is the squandered capacity that the embodiments of the invention recover to improve performance, efficiency, TCO, and power consumption. The challenge is in preserving the desired service quality metrics for the high priority workload, whose demand on the resource (s) is dynamic and may not be anticipated ahead of time.

The embodiments of the invention include novel techniques associated with dynamic, closed loop resource control. In one embodiment, prior training is used, embodied as a trained model which continuously guides the resource allocation towards a complex satisfiability region (represented by the region below line 1511 in FIG. 15B). In doing so, this embodiment includes techniques to identify the forward satisfiability region at each point in time based on one or more leading indicators.

Figure 16:
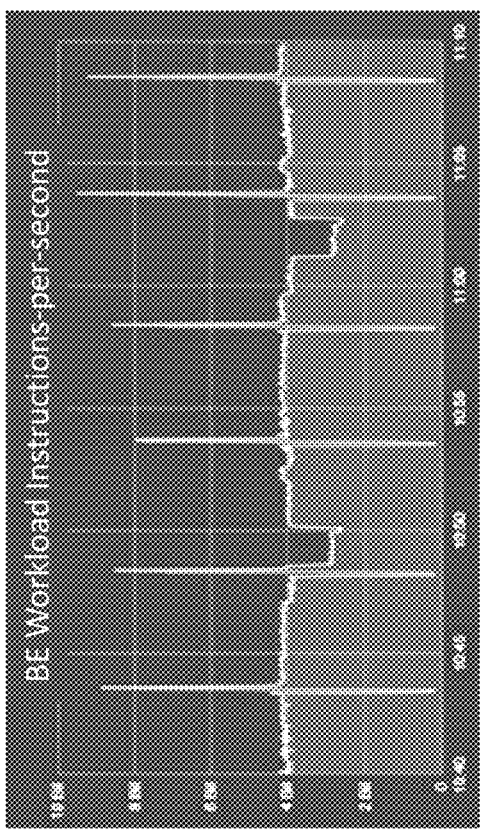
FIG. 16 illustrates a periodic throughput of a high priority workload.

One implementation of this embodiment was built with an Intel two-socket Xeon Platinum 8176 CPU server (SKX), running IPv4 Forwarding from DPDK as the high priority workload, and omnetpp from SPEC CPU 2006 as the best-effort workload. This configuration includes eleven LLC ways. The default setting is 9 ways allocated to the high priority IPv4 workload and 2 ways allocated to the best-effort workload. A policy was derived by dynamically allocating LLC ways between the high priority workload and best effort workload. FIG. 16 illustrates the ingress traffic pattern 1601 which was used to mimic a 24-hour network traffic pattern.

Figure 17A:
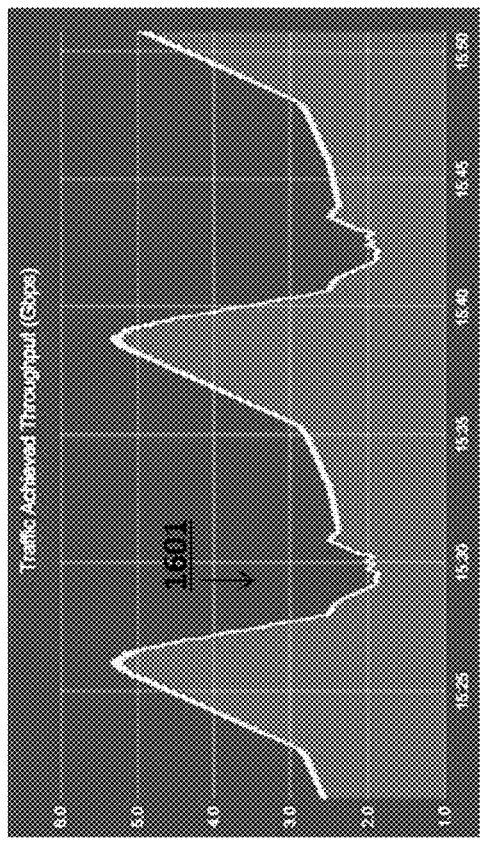
FIGS. 17A-C illustrate instructions/second for a best effort workload under different conditions including an implementation of one embodiment of the invention (FIG. 17B)
Figure 17B:
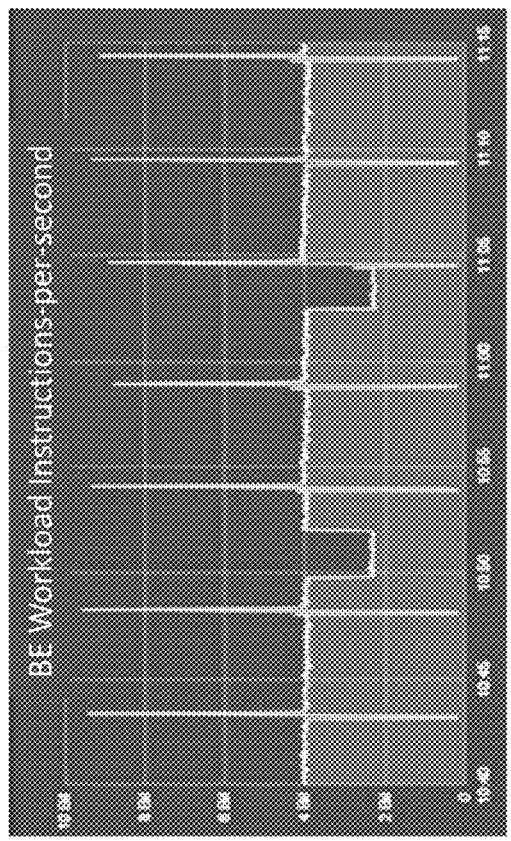
Figure 17C:
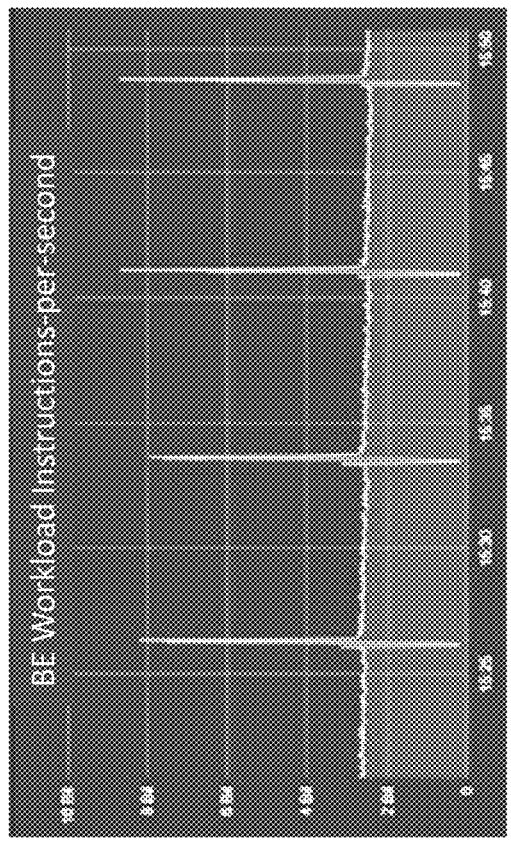

FIGS. 17A-C illustrate runtime performance for the BE workload measured in instruction per second. In the baseline static resource allocation, shown in FIG. 17A, the packet drop rate for the high priority workload is minimal (<0.01%), while the BE workload has the lowest performance. The resource allocation in this case consists of assigning 9 ways out of the 11 ways of the LLC to the high priority workload, and using the remaining 2 ways for the best effort workload.

FIG. 17B illustrates the performance of the best effort workload under a dynamic scheme which uses model-based control as described herein to steer the number of ways of the LLC differently in successive time segments. In this embodiment, the model-based control predicts (anticipates) the high priority workload's demand peaks of FIG. 16, keeping more cache ways with the high priority workload in the third and fifth time segments and maintaining the target (<0.01%) packet drop. With more LLC ways available to the BE workload on average in FIG. 17B, an overall higher performance is achieved in all time segments, with small dips in the 3rd and 5th segments; in these experiments, the average BE workload gain was 37% while meeting the baseline workload's <0.01% packet drop criterion for the high priority workload. FIG. 17B may be compared with the best possible behavior shown in FIG. 17C (representing a theoretically "ideal" allocation).

In one embodiment, a trained reinforcement learning (RL) model is used to steer the resource allocation in FIG. 17B. Additional details of the RL model are provided below. In summary, when used in one specific implementation, this model:

(1) associates higher levels of penalty with higher levels of packet drops for the high priority workloads, and associates a reward for maintaining packet drops below the SLA threshold;

(2) associates a varying level of reward for a dynamic higher level of LLC allocation for best effort workloads, conditionally on meeting the SLA threshold for the high priority workloads;

(3) generates a total reward comprising a combination of the reward and penalty functions for both the high priority workloads and the best effort workloads in (1), (2); and (4) initializes resource allocation change actions and states based on ingress traffic rate for the past N time windows, packet processing latency for the past N time windows, and current resource allocation for high priority workloads.

One reason for the success of the RL model formulation is the use of the ingress rates and latencies of the last N time windows as leading indicators, which are predictive of what will happen to currently arriving packets in the next time step. Thus, the training teaches the control model to anticipate the peaks in the test ingress function of FIG. 16. By integrating this information as feedback from a future (predicted) state, the closed loop resource control scheme is effectively proactive instead of reactive.

While one implementation described herein uses an RL training scheme, any other feedback control scheme may be used to track and adjust actions including those based on a leading indicator analysis, model, simulation, and formula. Resource allocation modifications are made using composite feedback including the current distance to a goal, and the anticipated future trajectory of the goal, based on current indicators. For the example of FIGS. 17A-C, the RL-trained control model follows an action-state-reward interaction.

Figure 18:
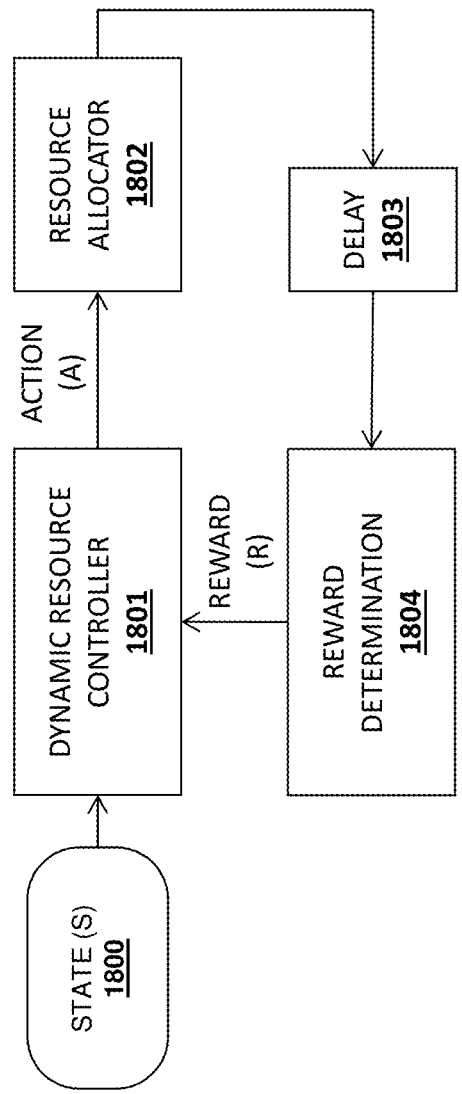
FIG. 18 illustrates an architecture for using machine learning for resource allocation in a processor and/or system.

One embodiment of an architecture for RL-trained control interactions is illustrated in FIG. 18. A resource allocator 1802, implemented in hardware, software or a combination thereof, specifies a resource allocation based on input from a dynamic resource controller 1801. For example, the resource allocator 1802 may signal a reallocation of a particular set of processor/system resources such as memory bandwidth allocations and cache capacity allocations (e.g., reallocating from a best effort workload to a high priority workload or vice versa). Following a delay 1803, reward determination logic 1804 evaluates the results of the resource allocation action, including penalty and reward values for different monitored variables, to determine a total reward value as described above. Based on the reward value and the current state 1800, the dynamic resource controller 1801 performs reinforcement learning based on the reward value to control the resource allocator 1802, requesting a more efficient allocation of resources for the best effort and high priority workloads.

Figure 19:
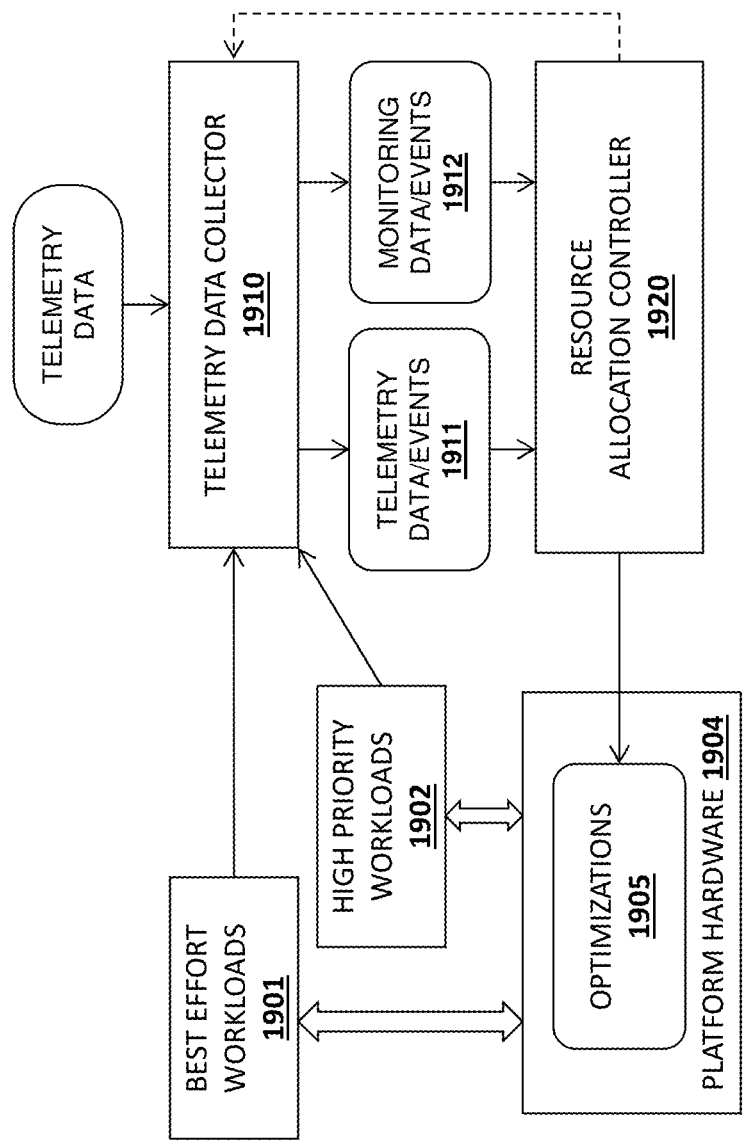
FIG. 19 illustrates another architecture in which telemetry data is collected and evaluated to make resource allocation optimizations.

FIG. 19 illustrates one embodiment to implement any closed loop control logic including, but not limited to, reinforcement learning logic. This embodiment of the framework includes a telemetry data collector 1910 for collecting and evaluating telemetry data related to different types of workloads including, but not limited to, best effort workloads, high priority workloads, multi-threaded workloads, and single-threaded workloads. In one embodiment, the telemetry data collector 1910 filters the telemetry data, identifying/generating telemetry data/events 1911 and/or monitoring data/events 1912 for telemetry data related to performance metrics of interest. By way of example, and not limitation, this may include memory latency data, the number of instructions retired per unit of time, cache miss rates, and cache allocation levels. Note, however, that any type of performance metrics may be tracked in this manner. For a networking workload such as an IPV4 workload, for example, the tracked metrics may include packet loss and packet processing latencies.

In one embodiment, a resource allocation controller 1920 analyzes the telemetry data/events 1911 and/or monitoring data/events 1912 to determine platform optimizations 1905 for simultaneously executing best effort workloads 1901 and high priority workloads 1902 on platform hardware 1904. One implementation of the resource allocation controller 1920 executes a control function such as the reinforcement learning implementation shown in FIG. 18. Alternatively, or in addition, the resource allocation controller 1920 may implement other machine learning, deep learning, or any other strategies for intelligently steering resource allocation on the platform hardware 1904. Thus, while certain embodiments described herein focus on reinforcement learning, the underlying principles of the invention are not limited to any particular form of dynamic optimization engine. Certain probabilistic techniques that quantify uncertainty in achieving a satisfaction region can also be effective in adapting resource allocation between less conservative and more conservative levels depending on the quantified uncertainty.

In a given implementation, multiple workloads may be running on a server platform at various priority levels. For example, one implementation may include three levels, high priority, medium priority, and best effort, while another implementation may include only high priority and best effort priority levels. In one embodiment, a priority level is specified as a number within a range of 0 to N, with 0 comprising the lowest priority and N comprising the highest priority (i.e., with the priority increasing based on increasing priority values).

Regardless of how the priority is defined, the SLAs for each priority class may be defined in terms of different key performance indicators (KPIs), such as packet loss rate, latency, throughput, and jitter. With concurrently executing workloads, it is possible to have a complex satisfiability region in which different KPIs interfere with each other.

One embodiment of a resource allocation framework allows each application to register multiple KPIs so that it can make intelligent allocation decisions. In this implementation, the telemetry collection subsystem 1910 periodically collects telemetry data, filters and stores it in a database, and provides an interface for visualization via various monitoring tools. The filtered/processed telemetry data, which may include the telemetry data/events 1911 and monitoring data/events 1912, is consumed by the resource allocation controller 1920 which evaluates the telemetry data to optimize resource allocation 1905 for the next time window (or the next two or three time windows to reduce oscillations). In one embodiment, the decision-making granularity for these optimizations 1905 can be configured by the user.

In one implementation, the optimizations performed by the resource allocation controller 1920 are derived by heuristics obtained from analyzing experimental workloads, from continuous learning using a probabilistic model, and/or from periodic and automatic learning using in-the-field machine learning approaches (e.g., reinforcement learning), or using hierarchical. In one embodiment, an ensemble model is used in which coarse-grained corrections are performed dynamically and quickly with finer-grained corrections applied on the coarse-grained corrections over time, with smaller effort and less risk.

As mentioned, one embodiment of the resource allocation controller 1920 uses leading indicators for making optimizations 1905 in each time window. In this embodiment, the resource allocation controller 1920 incorporates analysis and telemetry data 1911-1912 for leading factor observations; with the telemetry data collector 1910 capturing leading factors for traffic load and resource usage, so that it can take actions proactively based on past environment states. By way of example, and not limitation, using these techniques, the resource allocation controller 1920 can prevent packet loss from occurring, instead of merely taking reactive actions after observing that packet loss has already happened, as is the case with proportional-integrative-derivative (PID) approaches. Various forms of telemetry data/events 1911 and monitoring data/events 1912 may be collected such as queue occupancy, cache miss rate, ingress traffic rate for the past N time windows, packet latency for the past M time windows, hardware resource utilization, and application performance.

As mentioned, one embodiment of the resource allocation controller 1920 reallocates resources from region 1510 in FIG. 15B to best effort workloads. Given that this allocation is performed on behalf of to a non-critical best effort workload, one embodiment of the resource allocation controller 1920 implements a risk mitigation strategy, allowing for preemption of the resource by higher priority workloads without waiting for a next time window boundary. If, for example, the packet loss rate increases and comes within a threshold for the current time period (e.g., due to a fast rising ingress rate), then the resource allocation controller 1920, upon detecting this condition, dynamically reallocates one or more resources, preempting the best effort workload.

This implementation can dampen oscillation by overcorrecting in the immediate moment and then relaxing so that more resources again become available for allocation to best effort workloads. Sometimes the only negative effect on a best effort workload may be to increase its latency, which may be far more acceptable than absorbing a hit on the high priority workload. Thus in the example of FIGS. 17A-C, if the packet loss rate is rising, the hardware may preemptively increase cache allocation for the high priority workload instead of waiting for software to make a decision at the beginning of each decision window. This hybrid hardware and software coordination prevents packet loss for high priority workloads by taking actions more promptly while still maximizing performance for best effort workloads.

In general, when the demand rate for a resource whose availability is limited approaches saturation levels, response time grows without bound. For example, in an M/M/1-PS (exponentially distributed inter-arrival and service latency distribution with processor sharing) the mean response time for an arrival requiring $\xi$ amount of service can be shown to be $(\xi \times \mu)/(\mu - \lambda)$ where $\lambda$ and $\mu$ are arrival and service rates, respectively, meaning that response time grows boundlessly as $\lambda$ approaches $\mu$. The significance of this observation is that no matter how much capacity is reserved for a high priority workload, too large of a burst of arrivals can cause excursions in response time and thus a stringent SLA to be violated. As a result, an SLA must be accompanied by conditions on arrival rate (i.e., demand curve) under which the SLA can be met. As a trivial example, if the peak in FIG. 16 were too large (e.g., such as in the form of an impulse function), an SLA violation would result even if all 11 ways of the LLC were allocated to the IPV4 workload.

In one embodiment, the SLA satisfaction conditions for a high priority workload are accompanied with caps on how large the arrival bursts can be. The SLA may be a graduated one in which some specified percentile (e.g., $95^{th}$, $99^{th}$, etc) for the reciprocal of interarrival time must be below a threshold, and that threshold is a function of the SLA. As a result, instead of attempting to meet an absolute SLA that is invariant with respect to interarrival time histogram, one embodiment of an SLA is defined that flexes with the $N^{th}$ percentile of peak interarrival rate within each decision interval. This feature is referred to herein as a sliding or graduated SLA, in which the permitted KPI value changes. Thus, some packet drops may be forgiven (i.e., not considered in the reward/penalty determination) when the number of arrivals is excessive (e.g., exceeds a threshold) in a given decision interval.

In consideration of this arrangement, one embodiment of the invention includes a model for steering resources which is trained to meet a dynamic satisfaction criterion that changes with the instantaneous arrival rate within a time window. In addition, one embodiment adjusts from a strict SLA to a more flexible SLA under certain conditions. For example, when a strict SLA, referred to here as "S1", cannot be met for the high priority workload, it is permissible to meet a defined less strict SLA, "S2", such that the total number of transitions from S1 to S2 is bounded. For example, S1 may be defined as 0 packet drops and a maximum latency <15 microseconds and S2 may be defined as either 0 packet drops and maximum latency <20 microseconds, or 1 packet drop and a maximum latency <15 microseconds. The SLA may specify no more than two S1→S2 transitions in a 10 millisecond time interval. In this case, the goal is initially set to S2, and then if S1 is exceeded twice while meeting S2, then the goal is reset to S1 for the rest of the interval, and preemption is enforced as described above (e.g., preempting lower priority workloads).

The benefit of the above features is that they allow the SLA to build in a small amount of slack that is a function of demand, and to utilize that slack to improve beneficial utilization by parlaying more resources to a lower priority workload as a function of the available slack.

Figure 20:
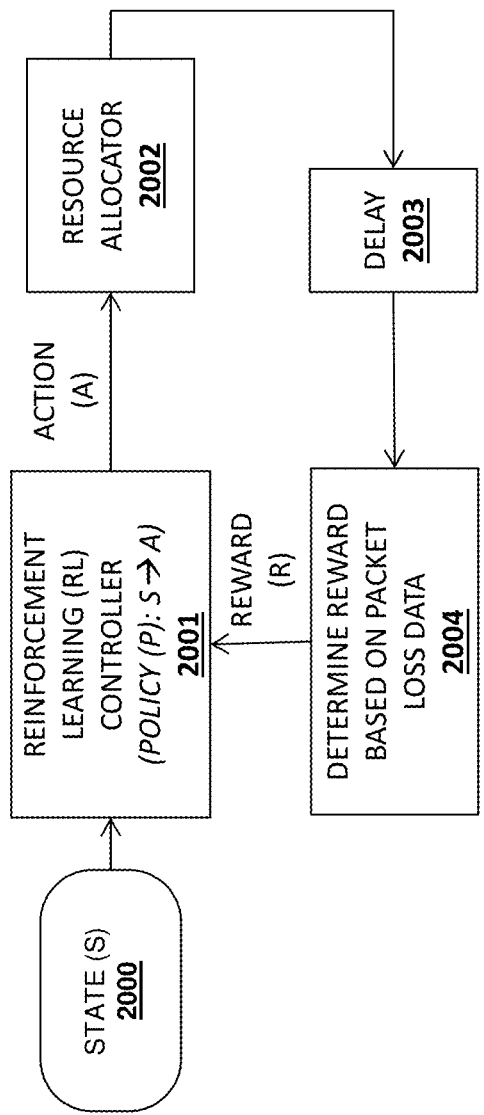
FIG. 20 illustrates a specific implementation in which reinforcement learning is performed based on packet loss data.

A specific implementation for determining a resource allocation policy using IPv4 forwarding as the high priority workload and omnetpp as the best effort workload will be described with respect to FIG. 20. Details of the platform were provided above (e.g., Intel two-socket Xeon Platinum 8176 CPU server (SKX), etc). In this embodiment, a reinforcement learning (RL) approach is used to manage packet loss. The RL controller 2001 continuously interacts with the system to collect relevant data and learns a policy that maximizes a cost function. In this embodiment, the components used in for resource learning include: action (A), state (S), policy (P), and reward (R). The RL controller 2001 implementing the current policy outputs the "Q-values" for each possible action based on the current state 2000. In this implementation, the RL controller 2001 may perform Q-learning or other reinforcement learning which generates Q-values based on a learned policy (e.g., SARSA, Deep Q Network, Deep Deterministic Policy Gradient, etc).

In one embodiment, the action with the maximum Q-value is applied to the resource allocator 2002 which performs the action in the form of resource allocations. After each action is implemented, following delay element 2003, the reward determination logic 2004 determines a reward value based on measured packet processing data (e.g., packet loss metrics). The RL controller 2001 then uses the new state 2000 and the reward value to improve the policy, potentially specifying new allocation actions based on the state 2000.

When used in the specific context of packet loss, the action A may be the number of last level cache (LLC) ways allocated to high priority and best effort workloads for the next time window. The state S is the ingress traffic rate for the past N time windows, packet latency for the past M time windows, as well as the current last level cache allocation.

The reward R reflects the goal of allocating the fewest possible LLC ways for the high priority workloads with the lowest possible packet loss and allocating the remaining LLC ways to the best effort workloads to improve sever utilization.

In one embodiment, the designed reward function is:

$$\text{Rpkt\_loss} = \begin{cases} -m1 & \text{if } pkt_{loss} > th1 \\ -m2 & \text{else if } pkt_{loss} > th2 \\ -m3 & \text{else if } pkt_{loss} > th3 \\ +m4 & \text{if } pkt_{loss} <= th3 \end{cases}$$

$$Rrdt = \begin{cases} \text{Current } LLC \text{ way allocation} & \text{if } pkt_{loss} > th3 \\ \text{Max } LLC \text{ way allocation} - \\ \text{Current } LLC \text{ way allocation} & \text{if } pkt_{loss} <= th3 \end{cases}$$

$$Rtotal = Rpkt_{loss} + Rrdt$$

Here the pkt_loss is the number of packets being dropped during the current time window. Rpkt_loss is the reward for packet loss. If the packet is smaller than a predefined acceptable threshold (e.g., zero packet loss or low packet loss depending on the use case), a positive reward, +m4, is assigned for the Rpkt_loss. If the packet drop is above this threshold, th3, a negative reward is assigned for the Rpkt_loss as a penalty. The greater the pkt_loss, the bigger the penalty (m1>m2>m3).

Rrdt is the reward for LLC way allocation. When there is no packet drop, a higher reward is provided for using fewer LLC ways for the high priority workloads. When there is packet drop, a higher reward is provided for using more LLC ways for a high priority workload.

The total reward, Rtotal, is the sum of Rpkt_loss and Rrdt, which takes into account both packet loss and LLC way allocation. As the model being trained, Rtotal will take the current software and platform parameters as the inputs and output the resource allocation strategy to the resource allocator 2002, which implements the resource allocation in the next time window.

Figure 21:
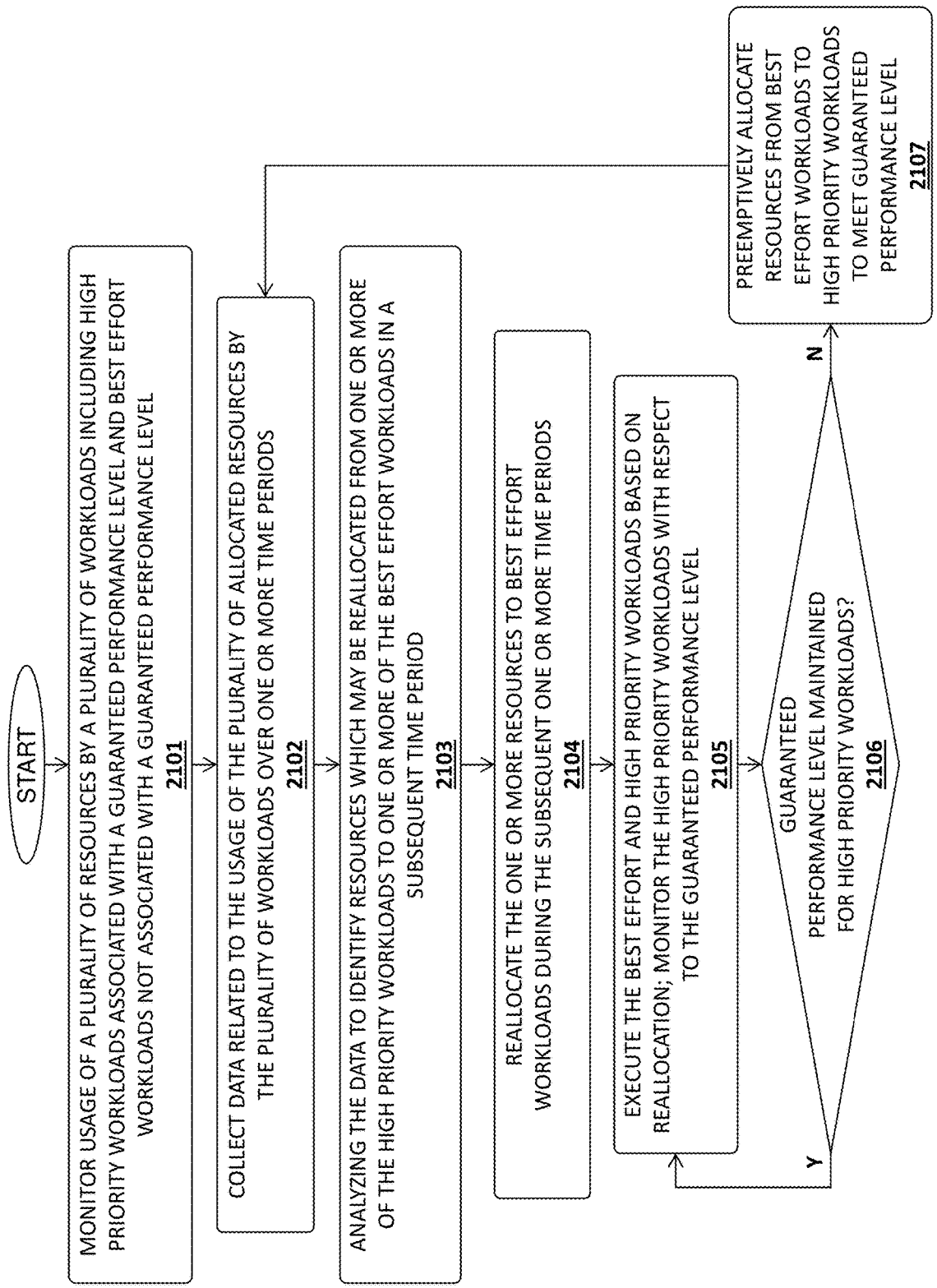
FIG. 21 illustrates a method in accordance with one embodiment of the invention.

FIG. 21 illustrates a method in accordance with one embodiment of the invention. The method may be implemented within the context of the processor and system architectures described herein, but is not limited to any particular architecture.

At 2101, the usage of a plurality of execution resources by a plurality of workloads is monitored. As mentioned, the workloads may include high priority workloads associated with guaranteed performance levels and best effort workloads not associated with guaranteed performance levels. Three or more priority levels may be specified in other embodiments.

At 2102 data is collected related to the usage of the plurality of allocated resources by the plurality of workloads over one or more time periods (e.g., a specified number of seconds, minutes, hours, days, etc). The data collected, for example, may be similar to the data shown in FIGS. 16 and 17A-B.

At 2103, the collected data is analyzed to identify resources which may be reallocated from one or more of the high priority workloads to one or more of the best effort workloads in a subsequent time period. For example, the surplus resources shown at 1510 in FIG. 15B may be identified. Moreover, periodic characteristics of the high priority workloads may be determined as shown in FIG. 16 so that the system may anticipate when additional resources will be available for reallocation as shown in FIG. 17B. As mentioned, the analysis may be performed by a machine learning engine. In one specific implementation, reinforcement learning is performed to evaluate data collected over various time periods, generate reward values to modify resource allocation, and continue to collect data and update the reward values based on information learned about the characteristics of the workloads.

At 2104 the identified resources are reallocated to best effort workloads during the subsequent one or more time periods. In one embodiment, a first amount of resources are allocated for a first time period, a second amount for a second time period, etc, based on any detected periodicity in the high priority workloads.

At 2105, the best effort and high priority workloads are executed with the new resource allocations. The high priority workloads are continuously monitored with respect to the guaranteed performance level. For example, in one embodiment, a resource allocation manager (e.g., a cluster manager or node-level manager as described below), monitors certain guaranteed performance indicators to ensure that the high performance workloads are in compliance with specified key performance indicators (KPIs). This may include, for example, guaranteed latency and throughput values.

At 2106, if it is determined that a guaranteed performance level of a high priority workload is nearing a breach condition (or if the performance level has already been breached), then at 2107, resources are preemptively allocated from the best effort workloads to the high priority workload to ensure that the guaranteed performance level is maintained (or to correct the breach as quickly as possible).

Using the techniques described above, workloads are monitored and surplus resources are dynamically allocated to execute best effort workloads more efficiently. At the same time, high priority workloads are monitored to ensure compliance with existing key performance indicators (KPIs). In one embodiment, the mile markers described below are used to continually monitor the high priority workloads, even when executed on node-based, distributed pipeline architectures.

Expressive Workload Performance Indicators for Performance Monitoring and Dynamic Resource Allocation One of the key elements of edge, cloud and other emerging architectures (e.g., Function-as-a-Service) is how to maximize service density per platform while maintaining a certain quality-of-service or Service Level Agreement (SLA). In this sense, there is a trade-off towards designing a platform to satisfy latency or bandwidth instances.

Increasing the number of services directly translates to increases in both throughput and latency. For example, in the case of gender facial recognition, it has been observed that throughput increases from 20 fps with a latency below 5 ms for a single core (per service) up to 140 fps with 40 ms of latency per request with 20 cores (per service).

Hence, depending on the metric to be optimized, the platform should be populated in different ways and with the appropriate quality of service knobs. In terms of quality of service or service level agreements, several types of potential models may apply:

1) No quality-of-service or service level agreement (SLA) to that particular service. This may mean that no fixed amount of private or shared resources are attached.
2) Soft Service Level Agreement. Services provide for allocation of a set amount of private resources (e.g., cores, logical processors, etc) and shared resources (e.g., LLC, memory, etc). In this model, the service will provide the throughput and latency to users depending on the amount of compute the private and shared resources can provide. However, the level of compute may be limited to the amount of services using the shared resources. Hence, in this scenario, 99% guaranteed latency may not be possible when the number of services and the pressure to the platform increases.
3) Hard Service Level Agreement. Service is using all resources in a private mode. In this case the expected jitter should be minimal. To achieve this SLA two approaches can be taken: (a) the platform is fully allocated to a service; and (b) all the shared resources can be hard partitioned and allocated to individual threads/tasks using allocation schemes such as Cache Allocation Technology or Memory Bandwidth Allocation Technology.

Achieving a truly end-to-end hardware partition (including L1, L2 allocations, memory bandwidth allocations, I/O, etc) on current systems is impractical. Moreover, end-to-end partitions will become more challenging as multi-tenancy and multi-service consolidation increases with large core counts. On such systems, it will be difficult to identify resources being utilized by particular services. This problem is particularly exacerbated with workload disaggregation into a set of micro-services or functions chained together, where proper management of other cluster-level resources such as network, memory, storage and accelerators must be considered.

Today there are no generic techniques capable of expressing and monitoring a service level agreement through a contract between the software and the hardware it runs on. Service level agreements are currently expressed in terms of tiers which are used to provide differentiated treatment of resource allocation. However, there is no guarantee of performance as it is difficult to connect the efficacy of these resources to the allocated application and its impact on performance.

Figure 22:
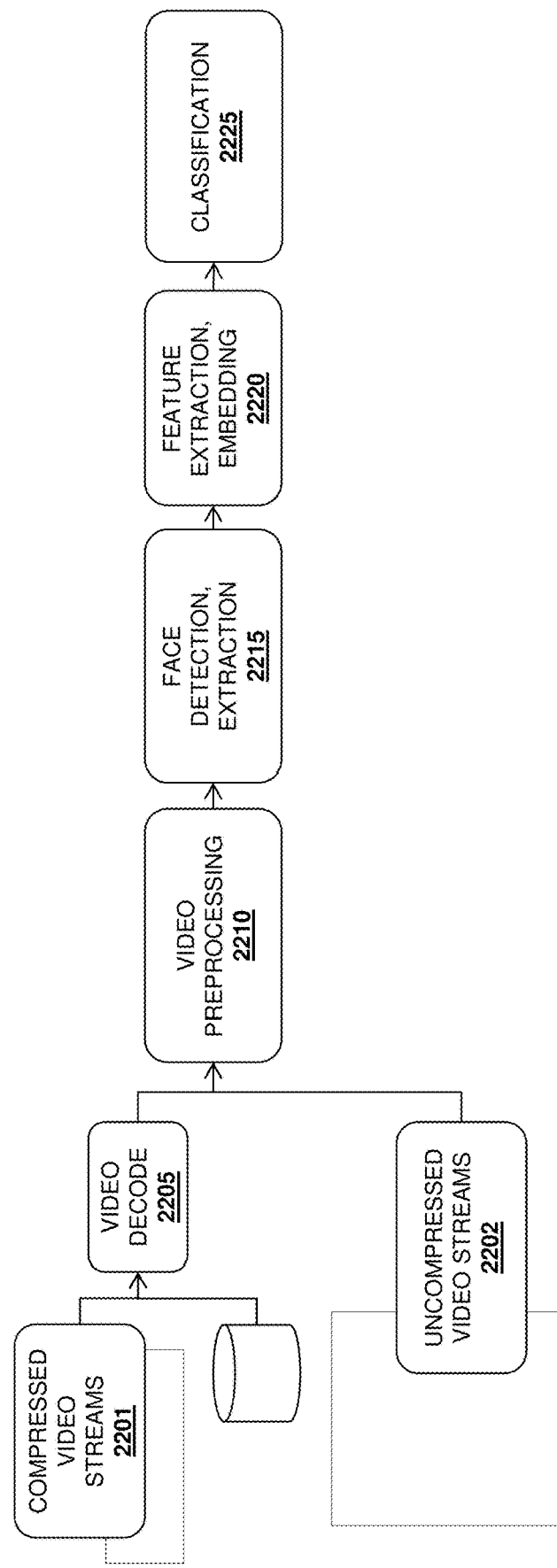
FIG. 22 illustrates an example of a facial recognition pipeline.

FIG. 22 illustrates one particular example of an end-to-end application for face recognition and its disaggregation into multiple stages being run on different nodes in a datacenter. Briefly, compressed video streams 2201 are decoded by video decode components 2205 (e.g., using H.264/H.265) and the resulting uncompressed video streams (as well as uncompressed video streams 2202 received directly into the system) are preprocessed by a video preprocessing component 2210. For example, the video processing component 2210 performs normalization operations such as resizing, slicing, and color space conversion. A face detection/extraction component 2215 performs face detection operations (e.g., using multi-task cascaded convolutional neural networks (MTCNN), YOLO Face, single shot (SSD), etc) and a feature extraction component 2220 extracts relevant image features, reducing storage requirements. Finally, a classification component 2225 performs facial classification using a binary classification technique such as support vector machines (SVM). All of the components in this execution pipeline (compute, network, storage) need to be monitored and managed properly to have real-time or predictable end-to-end performance guarantees.

Embodiments of the invention allow applications/workloads to communicate progress by producing progress markers, also referred to as "mile markers", which the hardware uses to monitor and dynamically adapt to workload changes. In particular, progress markers provide an efficient mechanism to allow the hardware (and associated software if applicable) to monitor workload progress and allocate resources accordingly to meet the requirements of the service level agreement between the workload and the hardware.

One embodiment of the invention ties an application performance target such as a service level objective (SLO) to resource allocation in order to achieve the SLO. Traditionally, SLO and SLA have been managed at the software level. However, with the increasing core count and high rate dynamic application requirements, software-managed solutions fail to provide meaningful SLA conformance. With the embodiments of the invention, hardware mechanisms provide significantly improved resource allocations for SLA conformance, using mile-markers to express the SLA in terms of mile-markers/time (e.g., in terms of throughput and/or latency).

In one embodiment, local hardware establishes various SLAs based on the SLO policies provided by the services via performance mile markers. Whenever the policy cannot be enforced, global loops are notified in order to implement a system level policy (e.g., migrating a service to another node or edge location). One embodiment of the invention includes the following components:

1) Workload instrumentation to express the notion of its execution progress, sometimes referred to as a "mile marker;
2) Service provider definition and mapping of an SLA to workload performance (e.g., speed may be expressed in miles/second and latency in time between mile markers);
3) Hardware at various levels (e.g., cluster level, node level, component level, etc) to measure the workload progress (speed monitoring).

The example of a video analytics pipeline for face-recognition will be used to illustrate operation of one embodiment of the invention. It should be noted, however, that the underlying principles of the invention are not limited to any particular type of application pipeline or set of workloads.

Figure 23:
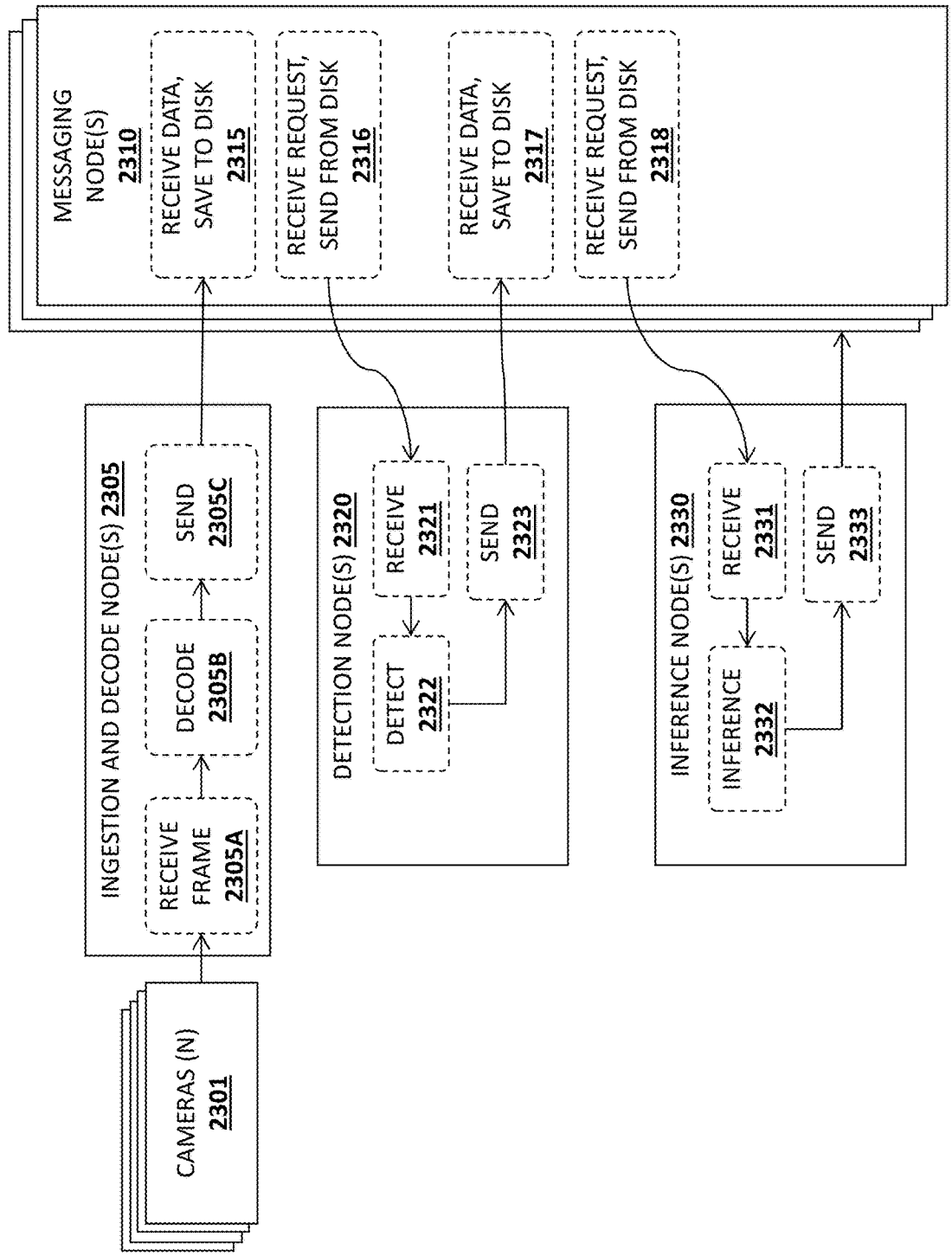
FIG. 23 illustrates an architecture for performing facial recognition on a distributed node architecture.

FIG. 23 illustrates an end-to-end flow of a compressed video stream entering a datacenter and being processed to detect and recognize faces. In this implementation, the data center supports a distributed streaming platform such as Apache Kafka, which includes groups of processing nodes, 2305, 2310, 2320, and 2330, with each group configured to perform a specific set of operations at one stage in the overall processing pipeline.

In video analytics example shown in FIG. 23, streams captured from cameras 2301 are transmitted to ingestion and decode nodes 2305 (e.g., at 30 fps, 60 fps, etc) which include circuitry/logic to receive the video streams 2305A, decode the video streams 2305B (e.g., via an H.264/H.265 decoder), and transmit the decoded video 2305C to a set of messaging nodes 2310.

The messaging nodes 2310 are specifically designed to store data to persistent and/or volatile storage 2315 received from data producers (e.g., the ingestion and decode nodes 2305) and transmit the data from the persistent storage 2316 in response to requests from data consumers. In this case, the consumers are a group of detection nodes 2320 which receive the video frames 2321, detect faces in the video frames 2322, and send the detection results 2323 back to the messaging nodes 2310.

The messaging nodes 2310 receive the results and store to persistent/volatile storage 2317 and transmit the data from the persistent storage 2318 in response to requests from a group of inference nodes 2330. The inference nodes receive the detection results 2331, perform inferencing operations 2332 on the results such as facial recognition to generate facial recognition results, and transmit the facial recognition results back to the messaging nodes 2310 from which the facial recognition results may be distributed to the computing devices which requested facial recognition.

The overall performance of the face-recognition flow depends on the progress of the workload through all the phases of ingestion, detection and inference including the message passing phase supported by the messaging nodes 2310, which are implemented by Apache Kafka in one embodiment. The workload performance indicator (KPI) for this example is the number of faces recognized per second, which is dependent on all components/nodes 2305, 2310, 2320, 2330 in the flow. It is very difficult to allocate compute, network and storage resources to support a required KPI (faces/second) as a service level agreement. For example, the faces/second KPI is not sufficiently generic for the hardware or resource orchestrator to understand and act upon. In addition, it is not directly convertible to the resource allocations at different stages 2305, 2310, 2320, 2330 of this cluster execution pipeline.

One embodiment of the invention includes software and/or circuitry to support monitoring each workload as it progresses between different nodes in the cluster. As mentioned, this may be accomplished by adding progress markers, also referred to herein as "mile markers", in the code and specifying the performance expectation in terms of the progress markers.

Figure 24A:
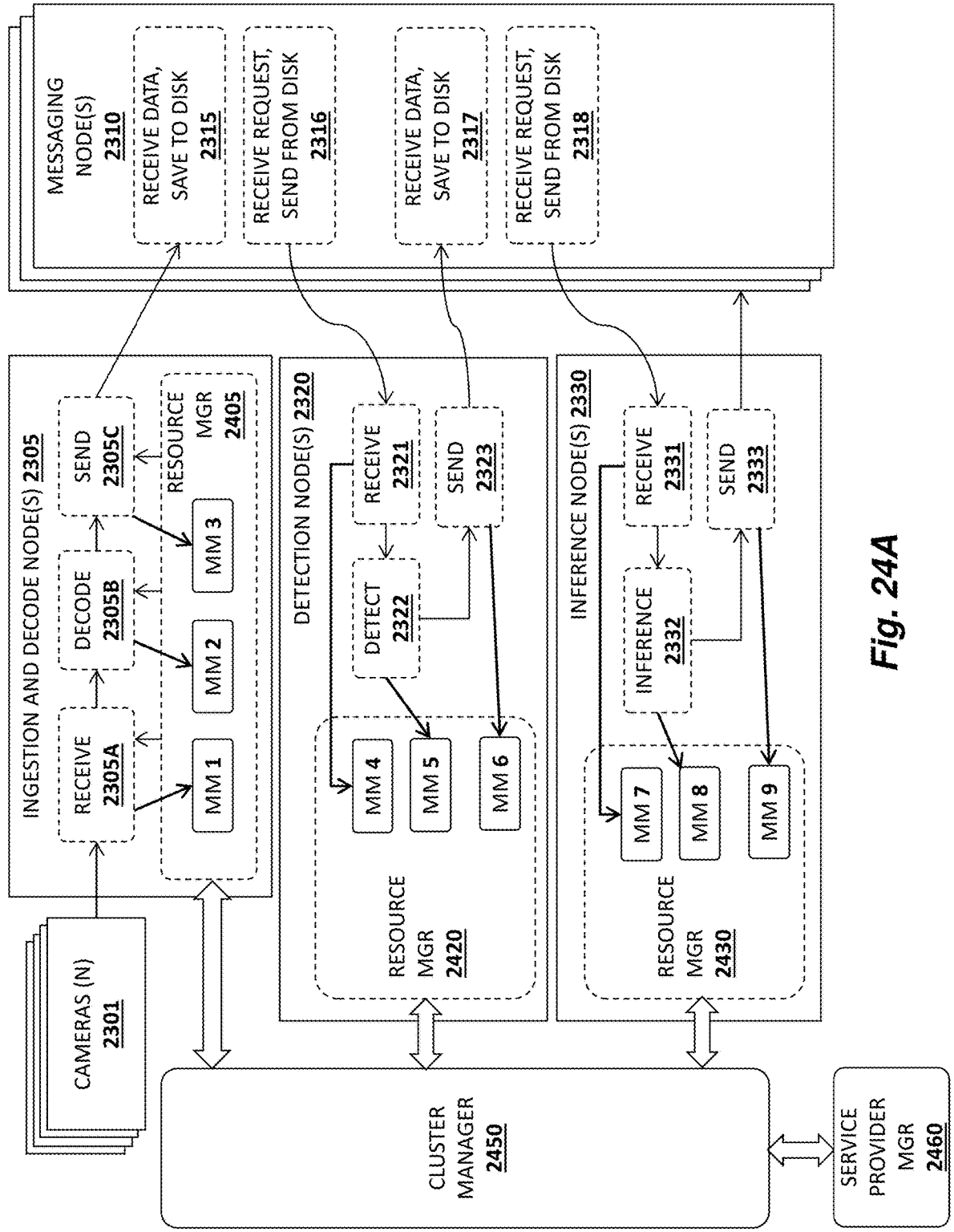
FIGS. 24A-B illustrate embodiments in which resource management is performed based on performance markers.

FIG. 24A illustrates the face recognition example of FIG. 23 using instrumented mile markers MM1-MM9 to track execution flow between the various processing nodes 2305, 2310, 2320, and 2330. The progress of the workload through the pipeline is announced using the mile markers as different stages are initiated or completed. For example, MM1 may be generated when the frame is first received, MM2 may be generated when decoding is initiated or completed, and MM3 may be generated when the decoded frame is transmitted to the messaging nodes 2310. In a similar manner, MM4 may be generated when the frame is received from the messaging nodes 2310, MM4 may be generated when the facial detection operation is initiated or completed, and MM6 may be generated when the facial recognition data is transmitted back to the messaging nodes 2310. Mile markers MM7, MM8, and MM9 are similarly generated based on initiation or completion of processing by the receive 2331, inference 2332 and send 2333 components, respectively.

In one embodiment, each mile marker includes a timestamp indicating when its pipeline stage was initiated and/or completed. In addition, the mile markers may indicate the processing stage and/or the specific node on which the stage was implemented.

In one implementation, a node-level resource manager 2405, 2420, and 2430 associated with each group of nodes 2304, 2320, and 2330, respectively, evaluates the performance data contained in the various mile markers MM1-MM9 and takes corrective action if necessary to ensure compliance with relevant KPIs. For example, if the mile markers indicate performance below a threshold, the node resource manager 2405 associated with ingestion and decode nodes 2305 may reallocate processing resources to improve performance with the receive, decode, and/or send stages 2305A-C.

In one embodiment, the resource manager operates under the control of a cluster manager 2450, which evaluates mile markers from across the processing cluster (and potentially other monitoring data) to make cluster-wide resource allocation decisions. The cluster manager 2450 may identify one or more groups of the nodes 2305, 2310, 2320, and 2330 which represent a performance bottleneck to the overall processing pipeline. For example, based on the timing data contained in the mile markers, the cluster manager 2450 may determine that the detection nodes 2320 are increasing the latency of the pipeline to reach or approach a threshold value. In response, the cluster manager 2450 may initialize additional nodes to the group of detection nodes 2320 to improve latency.

Thus, in this embodiment, the node-level resource managers 2405, 2420, 2430 may perform local resource allocation operations quickly and efficiently based on the mile markers and the cluster manager 2450 may perform cluster-wide resource allocations to ensure that KPIs such as throughput and latency are met for the workload. In addition, a service provider manager 2460 may perform service-wide analysis and resource allocations based on mile markers (and other data) received from multiple cluster managers 2450.

Using the above techniques, service provider SLAs can be provided as measures of mile markers, as throughput- and latency-related agreements which the cluster manager 2450 and/or node resource managers 2405, 2420, 2430 will enforce. In addition, each cluster manager 2450 can use these techniques to optimize the scheduling and compute, network and storage components to different tenants to ensure the required SLA conformance while lowering costs.

At the platform and/or processor level, one or more node-level resource managers 2405, 2420, 2430 can monitor the different stages of execution and manage the internal resource allocations. Allocation and enforcement of resource allocations may be accomplished by adjustments to the number of cores or logical processors assigned to a workload, the frequency of the cores (or groups of cores), the amount of cache resources allocated to each workload (e.g., number of cache ways, the amount of cache storage), and the memory bandwidth allocated to each workload. Once the resource allocations have been made, the node-level resource managers 2405, 2420, 2430 can enforce the resource allocations via cache allocation enforcement, memory bandwidth enforcement, etc, or any other processor-level resource management circuitry to provide the performance guarantees requested by the cluster manager 2450.

Figure 24B:
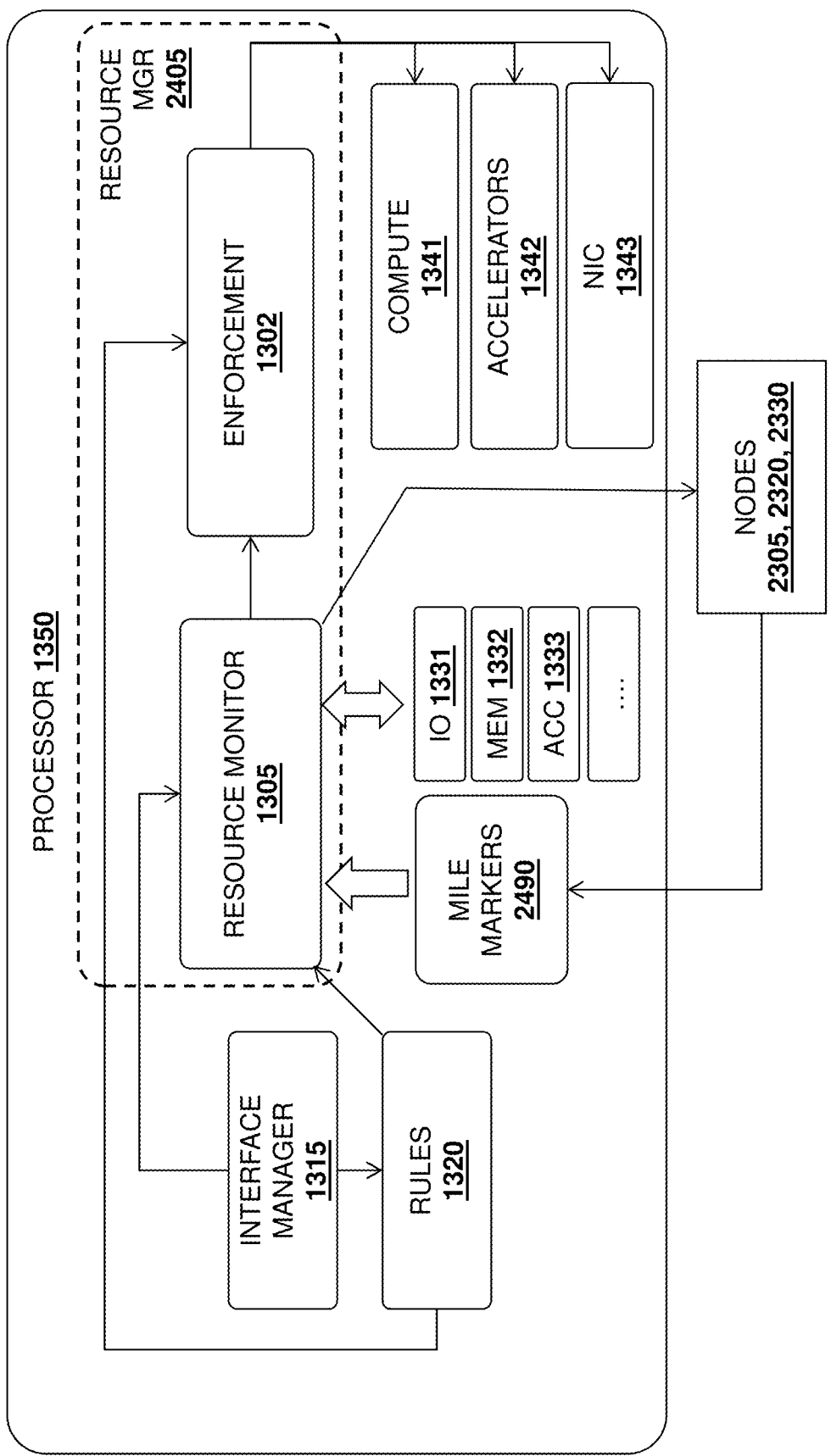

As illustrated in FIG. 24B, the various techniques for adjusting resource allocations based on mile markers as described above may be implemented in a local resource manager 2405 within a processor 1350. In particular, resource monitoring circuitry 1305 (previously described above with respect to FIG. 13) may evaluate the mile markers triggered in response to workload execution across the various service provider nodes. If the resource monitoring circuitry 1305 determines that the performance guarantees of an SLA are not being met, then it may determine a reallocation of resources on one or more of the nodes 2305, 2320, 2330. Enforcement circuitry 1302 may then enforce the new resource allocations on each individual node (e.g., within each processor 1350 of a node).

Using the above techniques, the service provider SLA may specify a workload metric in an application-specific manner reflecting the ultimate service provided by the application. For example, for facial recognition, the workload metric may be expressed in faces/second. In addition, key performance indicators may be expressed using mile markers. For example, a throughput KPI may be specified as mile markers 1-9/second and a latency KPI may be specified as the time between mile markers 1 and 9.

Cluster manager 2450 extensions may be implemented to specify the number of nodes per mile marker stages, the placement of mile marker nodes for SLA-guaranteed routing, and the dynamic allocation of accelerators to meet the SLA requirements.

Figure 25:
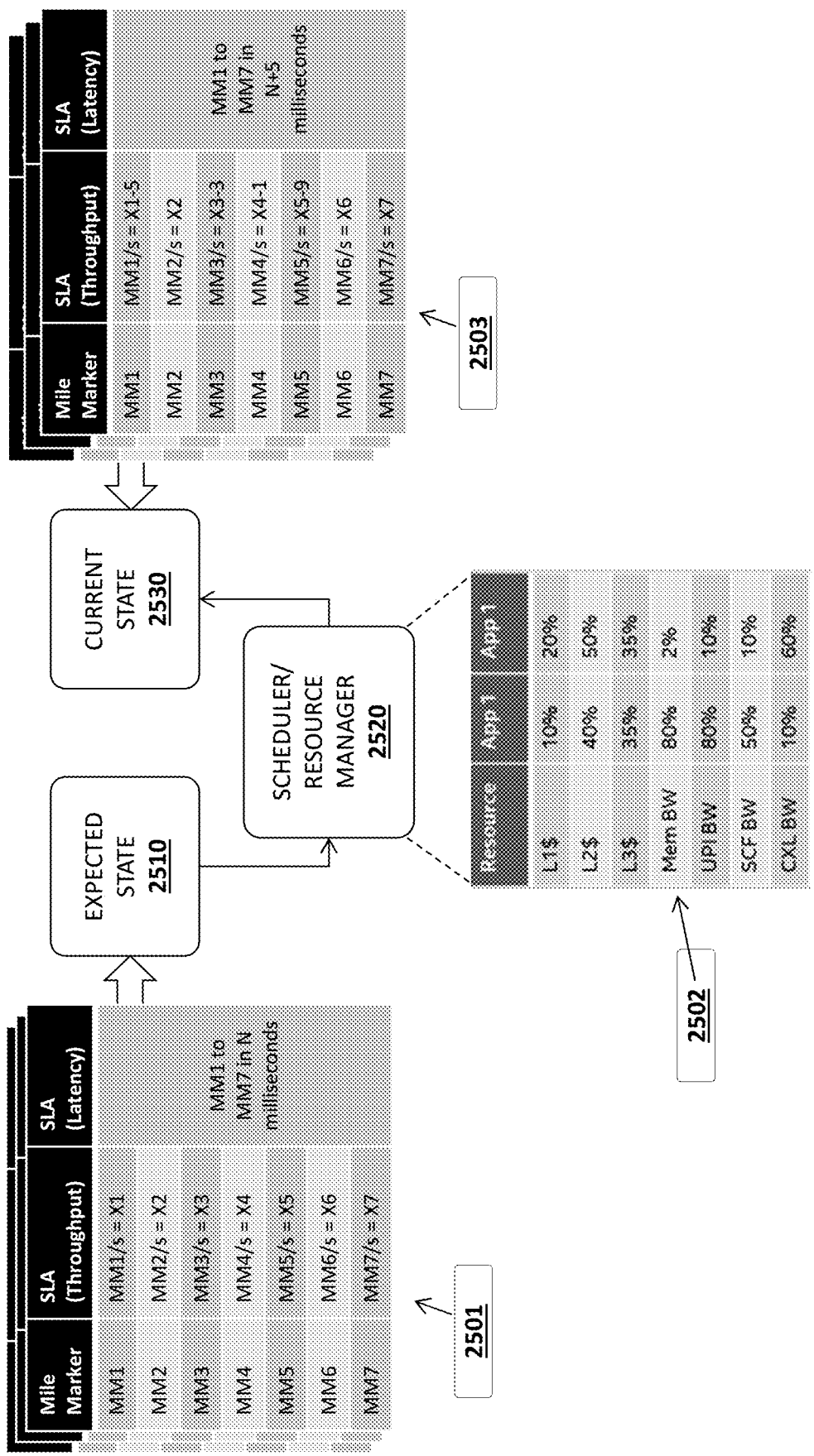
FIG. 25 illustrates one embodiment of a scheduler/resource manager for allocating resources based on an expected state and a current state.

FIG. 25 illustrates a representation of the mile-marker monitoring and resource management to support application level SLAs. An expected state 2510 is shown in table 2501 and a current state 2530 is specified in table 2503, both based on a set of mile markers MM1-MM7. An SLA throughput value is specified in mile markers/second and an SLA latency value is specified as the time for all mile markers to be generated.

A scheduler/resource manager 2520 dynamically adjusts resource allocations based on the differences detected between the expected 2510 and current states 2530. For example, in one embodiment, the scheduler/resource manager 2520 will adjust resource allocations to attempt to make the current state 2530 consistent with the expected state 2510.

Figure 26:
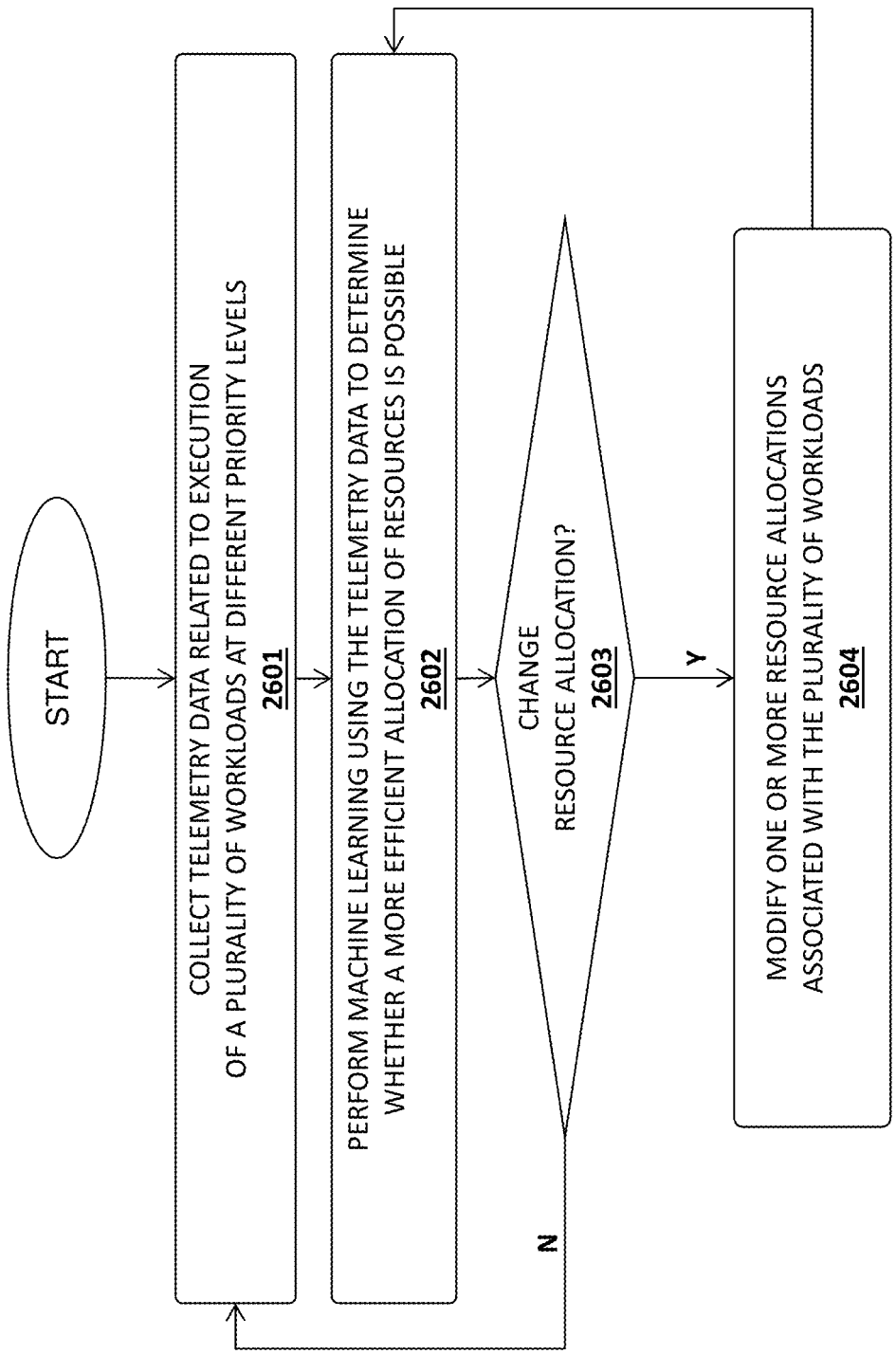
FIG. 26 illustrates a method in accordance with one embodiment of the invention.

A method in accordance with one embodiment of the invention is illustrated in FIG. 26. The method may be implemented on the architectures described herein, but is not limited to any particular processor or system architecture.

At 2601 telemetry data is collected related to the execution of a plurality of workloads at different priority levels. For example, in one embodiment, the workloads are categorized as high priority workloads and best effort workloads. At 2602 machine learning is performed using the telemetry data to determine whether a more efficient allocation of execution resources is possible. As described above, for example, a reinforcement learning engine is used in one embodiment to determine whether to perform resource allocations in accordance with a reward system (i.e., where rewards and penalties are generated based on measured performance metrics).

At 2603, if a more efficient allocation of resources is possible, then at 2604, one or more resource allocations associated with the plurality of workloads is modified. If a more efficient allocation is not possible or warranted, then the process returns to 2601.

Figure 27:
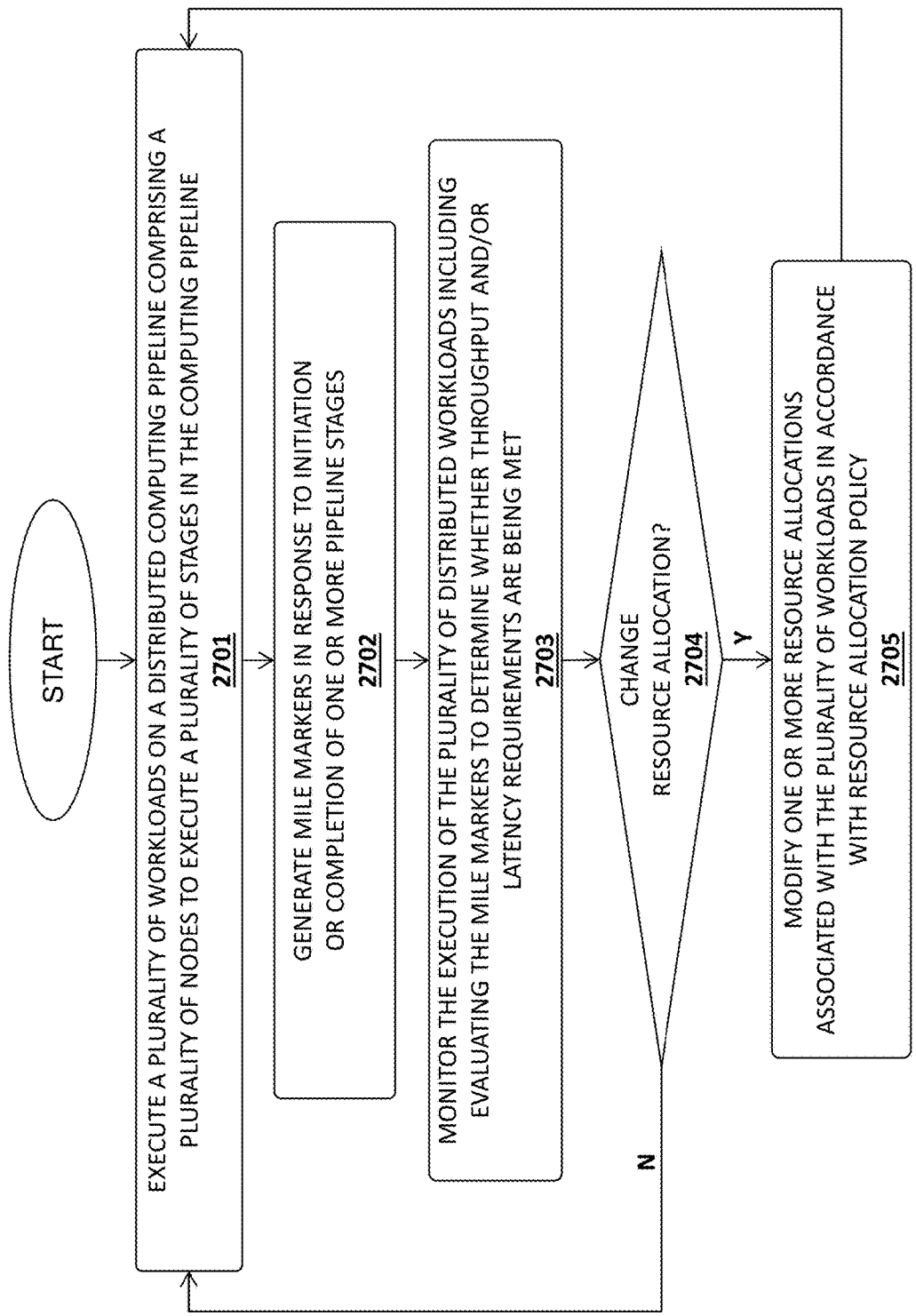
FIG. 27 illustrates a method in accordance with one embodiment of the invention.

A method in accordance with one embodiment of the invention is illustrated in FIG. 27. The method may be implemented on the architectures described herein, but is not limited to any particular processor or system architecture.

At 2701 a plurality of workloads are executed on a distributed computing pipeline comprising a plurality of nodes to execute a plurality of pipeline stages. Once such embodiment was described above with respect to FIG. 24.

At 2702, mile markers are generated in response to initiation or completion of one or more of the pipeline stages. For example, in response to the initiation of first and second pipeline stages associated with a first set of nodes, mile markers may be generated and provided to a local resource manager as described above.

At 2703, the execution of the plurality of distributed workloads is monitored using the mile markers to determine whether throughput and/or latency requirements are being met (e.g., as specified in an SLA/KPI) for one or more of the workloads. If so, then at 2704 the current resource allocations are not modified and the process returns to 2701. If not, then at 2704, a decision is made to change the one or more resource. At 2705, one or more resource allocations are modified in accordance with a current resource allocation policy.

EXAMPLES

The following are example implementations of different embodiments of the invention.

Example 1. A processor comprising: resource allocation circuitry to allocate a plurality of hardware resources to a plurality of workloads including priority workloads associated with one or more guaranteed performance levels; and monitoring circuitry to evaluate execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages, wherein the monitoring circuitry is to detect that the workload may not meet one of the guaranteed performance levels based on the progress markers, and wherein the resource allocation circuitry, responsive to the monitoring circuitry, is to reallocate one or more of the plurality of hardware resources to improve the performance level of the workload.

Example 2. The processor of example 1 wherein each progress marker is to include timing data indicating a time at which a corresponding processing stage was completed or initiated.

Example 3. The processor of example 2 further comprising: one or more control registers to store the timing data for evaluation by the monitoring circuitry.

Example 4. The processor of example 1 wherein a node of the plurality of nodes comprises a computing device configured to perform operations associated with a specific one of the processing stages.

Example 5. The processor of example 1 wherein the guaranteed performance levels include a guaranteed latency and/or a guaranteed throughput.

Example 6. The processor of example 5 wherein the guaranteed performance levels are to be specified as key performance indicators (KPIs) of a service level agreement (SLA).

Example 7. The processor of example 1 wherein the plurality of hardware resources include cache occupancy within at least one cache of the processor and/or at least one cache of a node.

Example 8. The processor of example 1 wherein the plurality of hardware resources include memory bandwidth to a memory coupled to the processor and/or a memory coupled to a node.

Example 9. A method comprising: allocating a plurality of hardware resources to a plurality of workloads including priority workloads associated with one or more guaranteed performance levels; evaluating execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages; detecting that the workload may not meet one of the guaranteed performance levels based on the progress markers; and responsively reallocating one or more of the plurality of hardware resources to improve the performance level of the workload.

Example 10. The method of example 9 wherein each progress marker is to include timing data indicating a time at which a corresponding processing stage was completed or initiated.

Example 11. The method of example 10 further comprising: storing the timing data in one or more control registers for evaluation.

Example 12. The method of example 11 wherein a node of the plurality of nodes comprises a computing device configured to perform operations associated with a specific one of the processing stages.

Example 13. The method of example 9 wherein the guaranteed performance levels include a guaranteed latency and/or a guaranteed throughput.

Example 14. The method of example 13 wherein the guaranteed performance levels are to be specified as key performance indicators (KPIs) of a service level agreement (SLA).

Example 15. The method of example 9 wherein the plurality of hardware resources include cache occupancy within at least one cache of the processor and/or at least one cache of a node.

Example 16. The method of example 9 wherein the plurality of hardware resources include memory bandwidth to a memory coupled to the processor and/or a memory coupled to a node.

Example 17. A machine-readable medium having program code stored thereon which, when executed by a machine, causes the machine to perform the operations of: allocating a plurality of hardware resources to a plurality of workloads including priority workloads associated with one or more guaranteed performance levels; evaluating execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages; detecting that the workload may not meet one of the guaranteed performance levels based on the progress markers; and responsively reallocating one or more of the plurality of hardware resources to improve the performance level of the workload.

Example 18. The method of example 17 wherein each progress marker is to include timing data indicating a time at which a corresponding processing stage was completed or initiated.

Example 19. The method of example 18 further comprising: storing the timing data in one or more control registers for evaluation.

Example 20. The method of example 19 wherein a node of the plurality of nodes comprises a computing device configured to perform operations associated with a specific one of the processing stages.

Example 21. The method of example 17 wherein the guaranteed performance levels include a guaranteed latency and/or a guaranteed throughput.

Example 22. The method of example 21 wherein the guaranteed performance levels are to be specified as key performance indicators (KPIs) of a service level agreement (SLA).

Example 23. The method of example 17 wherein the plurality of hardware resources include cache occupancy within at least one cache of the processor and/or at least one cache of a node.

Example 24. The method of example 17 wherein the plurality of hardware resources include memory bandwidth to a memory coupled to the processor and/or a memory coupled to a node.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   resource allocation circuitry to allocate a plurality of hardware resources to a plurality of workloads including priority workloads associated with one or more guaranteed performance levels; and
   monitoring circuitry to evaluate execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages,
   wherein the monitoring circuitry is to detect that the workload may not meet one of the guaranteed performance levels based on the progress markers, and
   wherein the resource allocation circuitry, responsive to the monitoring circuitry, is to reallocate one or more of the plurality of hardware resources to improve the performance level of the workload.

2. The processor of claim 1 wherein each progress marker is to include timing data indicating a time at which a corresponding processing stage was completed or initiated.

3. The processor of claim 2 further comprising:
one or more control registers to store the timing data for evaluation by the monitoring circuitry.

4. The processor of claim 1 wherein a node of the plurality of nodes comprises a computing device configured to perform operations associated with a specific one of the processing stages.

5. The processor of claim 1 wherein the guaranteed performance levels include a guaranteed latency and/or a guaranteed throughput.

6. The processor of claim 5 wherein the guaranteed performance levels are to be specified as key performance indicators (KPIs) of a service level agreement (SLA).

7. The processor of claim 1 wherein the plurality of hardware resources include cache occupancy within at least one cache of the processor and/or at least one cache of a node.

8. The processor of claim 1 wherein the plurality of hardware resources include memory bandwidth to a memory coupled to the processor and/or a memory coupled to a node.

9. A method comprising:
allocating a plurality of hardware resources to a plurality of workloads including priority workloads associated with one or more guaranteed performance levels;
evaluating execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages;
detecting that the workload may not meet one of the guaranteed performance levels based on the progress markers; and
responsively reallocating one or more of the plurality of hardware resources to improve the performance level of the workload.

10. The method of claim 9 wherein each progress marker is to include timing data indicating a time at which a corresponding processing stage was completed or initiated.

11. The method of claim 10 further comprising:
storing the timing data in one or more control registers for evaluation.

12. The method of claim 11 wherein a node of the plurality of nodes comprises a computing device configured to perform operations associated with a specific one of the processing stages.

13. The method of claim 9 wherein the guaranteed performance levels include a guaranteed latency and/or a guaranteed throughput.

14. The method of claim 13 wherein the guaranteed performance levels are to be specified as key performance indicators (KPIs) of a service level agreement (SLA).

15. The method of claim 9 wherein the plurality of hardware resources include cache occupancy within at least one cache of the processor and/or at least one cache of a node.

16. The method of claim 9 wherein the plurality of hardware resources include memory bandwidth to a memory coupled to the processor and/or a memory coupled to a node.

17. A non-transitory computer machine-readable storage medium having program code stored thereon which, when executed by a machine, causes the machine to perform the operations of:
allocating a plurality of hardware resources to a plurality of workloads including priority workloads associated with one or more guaranteed performance levels;
evaluating execution progress of a workload across a plurality of nodes, each node to execute one or more processing stages of the workload, wherein the monitoring circuitry is to evaluate the execution progress of the workload, at least in part, by reading progress markers advertised by the workload at the specified processing stages;
detecting that the workload may not meet one of the guaranteed performance levels based on the progress markers; and
responsively reallocating one or more of the plurality of hardware resources to improve the performance level of the workload.

18. The method of claim 17 wherein each progress marker is to include timing data indicating a time at which a corresponding processing stage was completed or initiated.

19. The method of claim 18 further comprising:
storing the timing data in one or more control registers for evaluation.

20. The method of claim 19 wherein a node of the plurality of nodes comprises a computing device configured to perform operations associated with a specific one of the processing stages.

21. The method of claim 17 wherein the guaranteed performance levels include a guaranteed latency and/or a guaranteed throughput.

22. The method of claim 21 wherein the guaranteed performance levels are to be specified as key performance indicators (KPIs) of a service level agreement (SLA).

23. The method of claim 17 wherein the plurality of hardware resources include cache occupancy within at least one cache of the processor and/or at least one cache of a node.

24. The method of claim 17 wherein the plurality of hardware resources include memory bandwidth to a memory coupled to the processor and/or a memory coupled to a node.

\* \* \* \* \*